(12) United States Patent
Togino et al.

(10) Patent No.: US 6,464,361 B2
(45) Date of Patent: Oct. 15, 2002

(54) IMAGE DISPLAY APPARATUS HAVING THREE-DIMENSIONALLY DECENTERED OPTICAL PATH

(75) Inventors: Takayoshi Togino, Koganei; Tetsuo Nagata, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/969,889

(22) Filed: Oct. 4, 2001

(65) Prior Publication Data

US 2002/0097197 A1 Jul. 25, 2002

(30) Foreign Application Priority Data

Oct. 5, 2000 (JP) ........................... 2000-306013

(51) Int. Cl.[7] ........................... G03B 21/14; G02B 27/14
(52) U.S. Cl. ........................... 353/98; 353/99; 353/122; 353/30; 359/637; 359/629; 359/633; 359/631
(58) Field of Search ........................... 353/7, 28, 98, 353/99, 100, 30, 69, 122; 349/11; 359/471, 477, 629, 631, 633, 637

(56) References Cited

U.S. PATENT DOCUMENTS

| | | | | |
|---|---|---|---|---|
| 5,392,158 | A | * 2/1995 | Tosaki | 359/633 |
| 6,104,540 | A | * 8/2000 | Hayakawa et al. | 359/637 |
| 6,144,497 | A | * 11/2000 | Hayashi et al. | 359/634 |
| 6,147,808 | A | * 11/2000 | Togino | 359/637 |
| 6,324,012 | B1 | * 11/2001 | Aratani et al. | 359/627 |
| 6,388,827 | B2 | * 5/2002 | Nagata et al. | 359/831 |

FOREIGN PATENT DOCUMENTS

| | | |
|---|---|---|
| JP | 6-110013 | 4/1994 |
| JP | 7-287185 | 10/1995 |
| JP | 9-61748 | 3/1997 |
| JP | 9-181998 | 7/1997 |
| JP | 9-181999 | 7/1997 |
| JP | 10-504115 | 4/1998 |

* cited by examiner

*Primary Examiner*—William Dowling
(74) *Attorney, Agent, or Firm*—Pillsbury Winthrop LLP

(57) ABSTRACT

The present invention relates to an image display apparatus in which an image from a single image display device is led to two eyes without using a half-mirror, thereby allowing observation of a bright image and facilitating correction of various aberrations. A viewing optical system includes a left ocular part 10L, a right ocular part 10R, and an optical path distributing part 20 for leading a light beam from a single image display device 3 to the left and right ocular parts 10L and 10R. The left and right ocular parts each have at least two reflecting surfaces 12R(L) and 13R(L). The planes of decentered optical paths of the axial principal rays in the left and right ocular parts are arranged to be approximately parallel to each other. The optical path distributing part 20 has optical surfaces 21L to 24L, 21R to 24R and 25 arranged in bilaterally rotational symmetry to form left and right optical paths that are not in plane symmetry with each other but in 180-degree rotational symmetry with respect to only a normal line passing through the center of the image display device 3. The optical path distributing part has at least two pairs of reflecting surfaces 22L(R) to 24L(R) as the optical surfaces for the left and right optical paths.

22 Claims, 15 Drawing Sheets

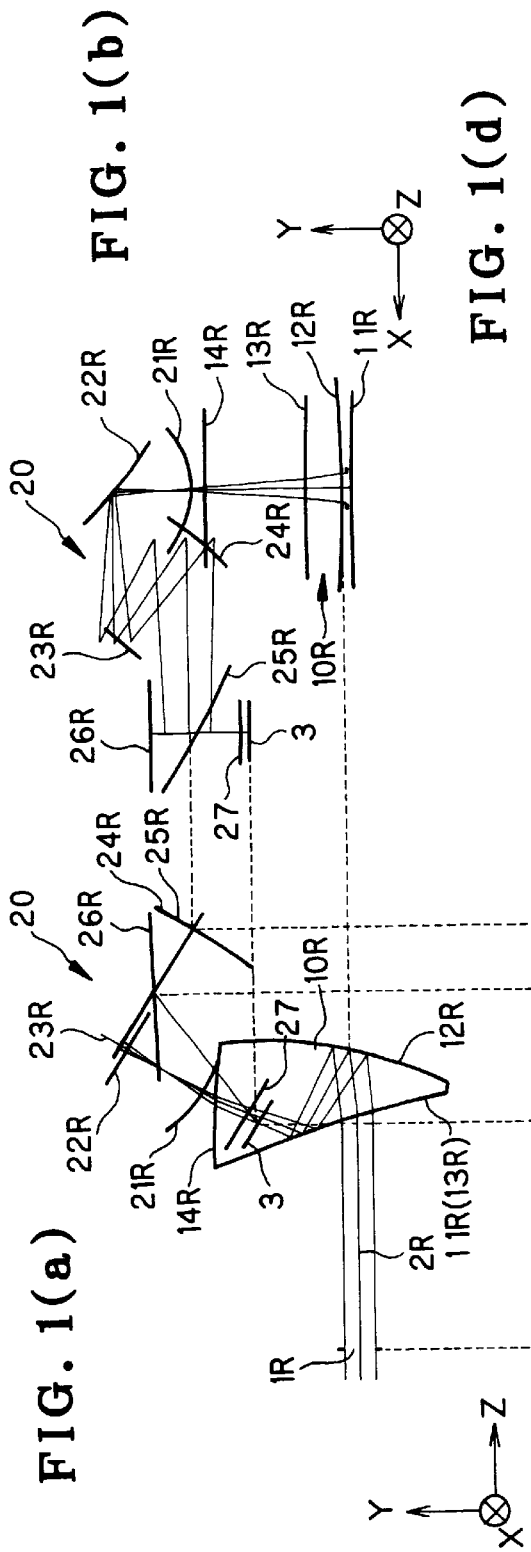
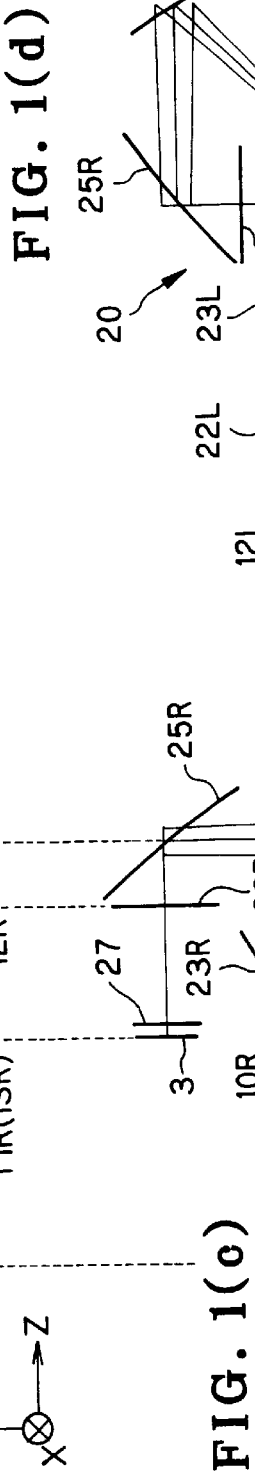
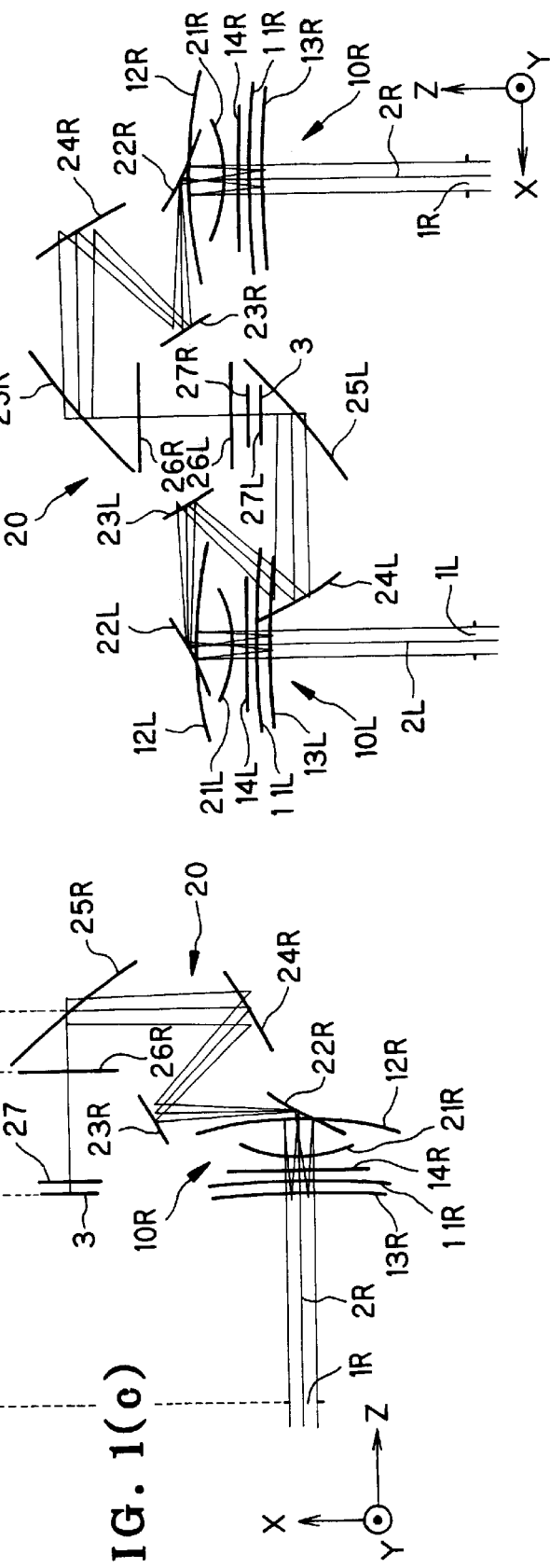

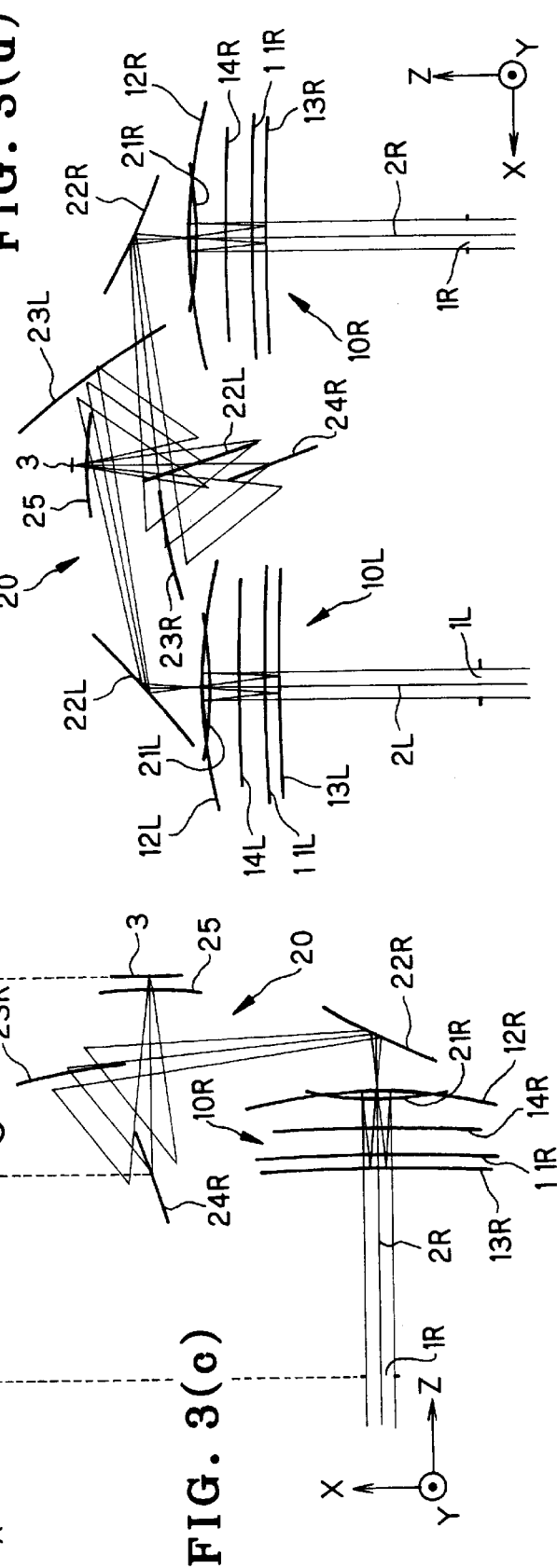

IMAGE DISPLAY APPARATUS HAVING THREE-DIMENSIONALLY DECENTERED OPTICAL PATH

This application claims benefit of Japanese Application No. 2000-306013 filed in Japan on Oct. 5, 2000, the contents of which are incorporated by this reference.

BACKGROUND OF THE INVENTION

The present invention relates to image display apparatus having a three-dimensionally decentered optical path. More particularly, the present invention relates to a head- or face-mounted image display apparatus that can be retained on an observer's head or face.

Image display apparatus designed to observe the image of a single image display device with two eyes have heretofore been known in Japanese Patent Application Unexamined Publication Nos. [hereinafter referred to as "JP(A)"] Hei 6-110013, Hei 7-287185, Hei 9-61748, Hei 9-181998, and Hei 9-181999, Published Japanese Translation of PCT International Publication No. Hei 10-504115, etc.

Among them, the image display apparatus of JP(A) Hei 6-110013 splits and folds light rays by using a prism in the shape of an isosceles triangular prism and a mirror. Therefore, correction of various aberrations is performed by using a lens placed in front of the pupil. This makes it difficult to correct aberrations, and at the same time, causes the apparatus to become large in size.

JP(A) Hei 7-287185 uses a plurality of mirrors and performs image formation with a single convex lens. Therefore, it is very difficult to perform assembly adjustment. In addition, appropriate performance cannot be attained. Although the image display device is placed three dimensionally, left and right optical systems are in bilateral symmetry with each other. Therefore, left and right images are in oppositely rotated relation to each other.

In JP(A) Hei 9-61748, display light from an LCD (Liquid Crystal Display) is split by using a half-mirror so as to be observed with two eyes. Because the display light is distributed to the left and right eyeballs, the image for observation is weak in light intensity and hence dark.

JP(A) Hei 9-181998 and Hei 9-181999 have an arrangement using only one reflecting surface and are not sufficiently corrected for decentration aberrations. Therefore, these image display apparatus cannot be applied to recent compact and high-definition image display devices. Further, the field angle is very narrow.

The image display apparatus of Published Japanese Translation of PCT International Publication No. Hei 10-504115 has a very large number of components and requires a very complicated assembling operation. Further, in this case, the image for observation is weak in light intensity and hence dark because a half-mirror is used.

In addition, with the recent achievement of small-sized image display devices, it has also become necessary to reduce the focal length of the viewing optical system. Further, in order to ensure a wide field angle, the focal length needs to be reduced. Consequently, it is difficult to ensure the required back focus, and it is impossible to increase the optical path length within the prism. As a result, it is impossible to increase the number of reflecting surfaces and hence impossible to correct decentration aberrations satisfactorily.

Further, recent image display devices are becoming higher in definition year by year.

SUMMARY OF THE INVENTION

The present invention was made in view of the above-described problems with the prior art. An object of the present invention is to provide a wide-field angle and low-cost image display apparatus, e.g. a head-mounted image display apparatus, in which an image from a single image display device is led to two eyes without using a half-mirror, thereby allowing observation of a bright image, and in which at least four reflecting surfaces having curved surfaces are used to form an optical system, thereby facilitating correction of various aberrations to obtain compatibility with recent compact and high-definition image display devices. Another object of the present invention is to further widen the field angle of an image display apparatus such as that proposed previously in Japanese Patent Application No. 2000-48750.

An image display apparatus having a three-dimensionally decentered optical path according to the present invention provided to attain the above-described objects includes an image display device for forming an image for observation on an image display area. The image display apparatus further includes a viewing optical system for leading the image formed by the image display device to a pupil corresponding to a position where an eyeball of an observer is to be placed.

The image display device is a single image display device having a plurality of pixels juxtaposed on a single substrate.

Each pixel located at least in the central portion of the single image display device is arranged to emit an image light beam at such an exit angle that the light beam can be led to the left and right eyes of the observer.

The viewing optical system includes, at least, a left ocular part for leading the light beam to the left eye of the observer; a right ocular part for leading the light beam to the right eye of the observer; and an optical path distributing part for distributing the image light beam emitted from the image display device at the above-described exit angle to the left and right ocular parts.

The left ocular part has at least two reflecting surfaces. At least one of the at least two reflecting surfaces is formed from a rotationally asymmetric curved reflecting surface having the function of correcting decentration aberrations.

The right ocular part has at least two reflecting surfaces. At least one of, the at least two reflecting surfaces is formed from a rotationally asymmetric curved reflecting surface having the function of correcting decentration aberrations.

The left and right ocular parts are arranged so that the plane of a decentered optical path of an axial principal ray formed by the at least two reflecting surfaces of the left ocular part (the plane being a YZ-plane, which is the vertical direction of the observer) and the plane of a decentered optical path of an axial principal ray formed by the at least two reflecting surfaces of the right ocular part (the plane being a YZ-plane, which is the vertical direction of the observer) are approximately parallel to each other (YZ-plane).

The optical path distributing part has optical surfaces arranged in bilaterally rotational symmetry to form left and right optical paths that are not in plane symmetry with each other but in 180-degree rotational symmetry with respect to only a normal line passing through the center of the image display device. The optical path distributing part has at least two pairs of reflecting surfaces for the left and right optical paths as the optical surfaces.

The reasons for adopting the above-described arrangement in the present invention, together with the function thereof, will be described below.

In general, the distance between the human pupils is said to be approximately 64 millimeters on the average and differs among individuals. Therefore, it is preferable that the pupil of the viewing optical system for observation with both eyes should be set long sideways in advance with a view to absorbing the difference in interpupillary distance among individuals in the viewing optical system. In other words, it is preferable that the pupil of the viewing optical system should be an elliptical (or rectangular, etc.) pupil that is long in the horizontal direction of the observer.

In that case, if the longitudinal direction of the pupil and the decentration direction of the ocular part are set in the same direction, it becomes unavoidably necessary to decenter the ocular part to a considerable extent in order to ensure the required effective area. Consequently, the amount of decentration aberrations produced becomes extremely large. To minimize the amount of decentration, the overall size of the optical system has to be increased. In addition, because the human interpupillary distance restricts the extent to which the size of the optical system can be made large sideways, it is impossible to achieve a wide field angle.

For these reasons, setting the decentration direction of the ocular part in the vertical direction of the observer is advantageous for obtaining a wide-field angle, compact and high-performance viewing optical system.

It is, as a matter of course, favorable for the above-described optical path distributing part also to be arranged so that the decentration direction and the longitudinal direction of the pupil are different from each other as much as possible. However, because the light beam from the image display device forms a relay image of small magnification in the optical path distributing part, the required effective area is smaller than in the ocular part. Therefore, the influence due to the above-described reasons is less significant.

In addition, it is desirable that the optical path distributing part should have at least two pairs of rotationally asymmetric curved reflecting surfaces having the function of correcting decentration aberrations.

Further, the optical path distributing part has optical surfaces arranged in bilaterally rotational symmetry to form left and right optical paths that are not in plane symmetry with each other but in 180-degree rotational symmetry with respect to only a normal line passing through the center of the image display device. The optical path distributing part has at least two pairs of reflecting surfaces as the optical surfaces for the left and right optical paths.

In the arrangement of an image display apparatus using a single image display device for observation with left and right eyes (i.e. single-panel binocular vision), optical systems that are in bilaterally plane symmetry with each other are generally employed for the left and right eyes. In this case, the image display device also needs to be placed in a bilaterally plane symmetric position. When a two-dimensionally decentered optical path is used for a viewing optical system, the arrangement is as shown in the image view of FIG. 10. Assuming that the coordinates of the observer are $(X_0, Y_0, Z_0)$ and the coordinates of the image display device are $(X_i, Y_i, Z_i)$, the image display device is invariably placed in a position where the center of the image display device lies at the position of bilaterally plane symmetry and the image display device is parallel to the observer's face. However, when bilaterally symmetric three-dimensional optical paths are used for the arrangement, as shown in the image view of FIG. 11, it is possible to view a single image display device with both eyes even in a case where the image display device is placed in a rotated position about the $X_i$-axis (i.e. when the image display device is placed so as to face opposite the observer and it is assumed that an $X_i$-axis is taken in the long-side direction of the image display device, and a $Y_i$-axis is taken in the short-side direction thereof, and further a $Z_i$-axis is taken in the normal direction with respect to the image display device, the image display device can only rotate about the $X_i$-axis) However, when the optical path is three-dimensionally decentered arbitrarily, rotation of the image about the axial principal ray occurs. In the case of optical systems that are in bilaterally plane symmetry with each other, the images of the image display device that are displayed in the left and right eyes are in oppositely rotated relation to each other. Therefore, the two images seen with the left and right eyes cannot properly be fused into a single image. If it is intended to construct optical paths so that such image rotation does not occur in the bilaterally plane symmetric arrangement, the optical paths become very complicated, causing the apparatus to become large in size.

Further, it is necessary that first left and right reflecting surfaces in the optical path distributing part that reflect the light beam from the image display device should be placed to face opposite to the image display device side-by-side in the longitudinal direction of the image display device. In this case, owing to the fact that the image display device is rectangular and that the pupil of the optical system is elliptical, it is necessary to ensure the above-described reflecting surfaces effective diameter areas that are enlarged in the horizontal direction. For this reason, the optical system must unavoidably be increased in size in order to arrange the optical system so that the left and right optical paths do not interfere with each other within the above-described human interpupillary distance range.

In the arrangement of the present invention, the optical path distributing part forms left and right optical paths that are not in plane symmetry with each other but in 180-degree rotational symmetry with respect to only a normal line passing through the center of the image display device. Therefore, the reflecting surfaces of the left and right optical paths can be readily arranged so that the optical paths do not interfere with each other, without increasing the size of the optical system. Further, regarding the positioning of the image display device, it is possible to rotate the image display device about the normal line passing through the center of the image display device. Accordingly, the degree of freedom for design increases (i.e. when the image display device is placed so as to face opposite the observer and it is assumed that an $X_i$-axis is taken in the long-side direction of the image display device, and a $Y_i$-axis is taken in the short-side direction thereof, and further a $Z_i$-axis is taken in the normal direction with respect to the image display device, the image display device can rotate about the $X_i$-axis and also about the $Z_i$-axis). In addition, the rotation of the image occurring when the optical path is three-dimensionally decentered can be absorbed by rotating the image display device because the image rotates in the same direction in the left and right optical paths. At that time, the first left and right reflecting surfaces in the optical path distributing part that reflect the light beam from the image display device have their effective diameter areas rotated together with the rotation of the image display device. Accordingly, it becomes unnecessary to place the above-described left and right reflecting surfaces side-by-side in the horizontal direction as viewed from the observer. Therefore, it becomes easy to ensure the effective diameter area for each reflecting surface and the optical paths within the human interpupillary distance range.

An image view of the arrangement of an optical path distributing prism in Examples 1 and 2 (described later) is shown in FIG. 12, and an image view of the arrangement of an optical path distributing prism in Example 3 is shown in FIG. 13. In Examples 1 and 2, the image rotates through 90° in the same direction in the left and right optical paths. Therefore, the image display device is placed in a vertical position (i.e. the horizontal direction of the image display area of the image display device extends in the vertical direction). In Example 3, because three-dimensionally optical paths are formed arbitrarily, the image display device can assume a position in which it is rotated arbitrarily about the $Z_i$-axis (through 15.73° in actuality).

Further, in the image display apparatus according to the present invention, a single image display device can be viewed with both eyes. Accordingly, the costs can be reduced extremely.

In addition, each ocular part has at least two reflecting surfaces, and at least one of the reflecting surfaces is formed from a rotationally asymmetric curved reflecting surface having the function of correcting decentration aberrations. Therefore, it is possible to perform favorable aberration correction.

In the present invention, a free-form surface is used as a typical example of a surface having a rotationally asymmetric curved surface configuration. A free-form surface is defined by the following equation. The Z-axis of the defining equation is the axis of a free-form surface.

$$Z = cr^2 / \left[1 + \sqrt{\{1 - (1+k)c^2 r^2\}}\right] + \sum_{j=2}^{66} C_j X^m Y^n \quad (a)$$

In the equation (a), the first term is a spherical surface term, and the second term is a free-form surface term.

In the spherical surface term:
c: the curvature at the vertex
k: a conic constant $r = \sqrt{(X^2 + Y^2)}$ The free-form surface term is given by $$\sum_{j=2}^{66} C_j X^m Y^n = C_2 X + C_3 Y + C_4 X^2 + C_5 XY + C_6 Y^2 + C_7 X^3 C_8 X^2 Y +$$
$$C_9 XY^2 + C_{10} Y^3 + C_{11} X^4 + C_{12} X^3 Y + C_{13} X^2 Y^2 + C_{14} XY^3 +$$
$$C_{15} Y^4 + C_{16} X^5 + C_{17} X^4 Y + C_{18} X^3 Y^2 + C_{19} X^2 Y^3 + C_{20} XY^4 +$$
$$C_{21} Y^5 + C_{22} X^6 + C_{23} X^5 Y + C_{24} X^4 Y^2 + C_{25} X^3 Y^3 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \ldots$$

where $C_j$ (j is an integer of 2 or higher) are coefficients.

In general, the above-described free-form surface does not have planes of symmetry in both the XZ- and YZ-planes. However, a free-form surface having only one plane of symmetry parallel to the YZ-plane is obtained by making all terms of odd-numbered degrees with respect to X zero. A free-form surface having only one plane of symmetry parallel to the XZ-plane is obtained by making all terms of odd-numbered degrees with respect to Y zero.

In addition, free-form surfaces as the above-described surfaces with a rotationally asymmetric curved surface configuration may be defined by Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), R is the distance from the Z-axis in the XY-plane, and A is the azimuth angle about the Z-axis, which is expressed by the angle of rotation measured from the X-axis.

$x = R \times \cos(A)$ $y = R \times \sin(A)$ $Z = D_2$ $+ D_3 R \cos(A) + D_4 R \sin(A)$ $+ D_5 R^2 \cos(2A) + D_6 (R^2 - 1) + D_7 R^2 \sin(2A)$ $+ D_8 R^3 \cos(3A) + D_9 (3R^3 - 2R)\cos(A) + D_{10}(3R^3 - 2R)\sin(A) + D_{11} R^3 \sin(3A)$ $+ D_{12} R^4 \cos(4A) + D_{13}(4R^4 - 3R^2)\cos(2A) + D_{14}(6R^4 - 6R^2 + 1) + D_{15}(4R^4 - 3R^2)\sin(2A) + D_{16} R^4 \sin(4A)$ $+ D_{17} R^5 \cos(5A) + D_{18}(5R^5 - 4R^3)\cos(3A) + D_{19}(10R^5 - 12R^3 + 3R)\cos(A) + D_{20}(10R^5 - 12R^3 + 3R)\sin(A) + D_{21}(5R^5 - 4R^3)\sin(3A) + D_{22} R^5 \sin(5A)$ $+ D_{23} R^6 \cos(6A) + D_{24}(6R^6 - 5R^4)\cos(4A)$ $+ D_{25}(15R^6 - 20R^4 + 6R^2)\cos(2A)$ $+ D_{26}(20R^6 - 30R^4 + 12R^2 - 1)$ $+ D_{27}(15R^6 - 20R^4 + 6R^2)\sin(2A)$ $+ D_{28}(6R^6 - 5R^4)\sin(4A) + D_{29} R^6 \sin(6A) \quad (b)$ where $D_m$ (m is an integer of 2 or higher) are coefficients.

It should be noted that to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ should be used.

The above defining equations are shown to exemplify surfaces with a rotationally asymmetric curved surface configuration. Therefore, the same advantageous effects can be obtained for any other defining equation that expresses such a rotationally asymmetric curved surface configuration.

It should be noted that other examples of defining equations for free-form surfaces include the following defining equation (c):

$Z = \Sigma\Sigma C_{nm} XY$

Assuming that k=7 (polynomial of degree 7), for example, a free-form surface is expressed by an expanded form of the above equation as follows:

$Z = C_2$ $+ C_3 Y + C_4 |X|$ $+ C_5 Y^2 + C_6 Y|X| + C_7 X^2$ $+ C_8 Y^3 + C_9 Y^2 |X| + C_{10} YX^2 + C_{11}|X^3|$ $+ C_{12} Y^4 + C_{13} Y^3 |X| + C_{14} Y^2 X^2 + C_{15} Y|X^3| + C_{16} X^4$ $+ C_{17} Y^5 + C_{18} Y^4 |X| + C_{19} Y^3 X^2 + C_{20} Y^2 |X^3| + C_{21} YX^4 + C_{22}|X^5|$ $+ C_{23} Y^6 + C_{24} Y^5 |X| + C_{25} Y^4 X^2 + C_{26} Y^3 |X^3| + C_{27} Y^2 X^4 + C_{28} Y|X^5| + C_{29} X^6$ $+ C_{30} Y^7 + C_{31} Y^6 |X| + C_{32} Y^5 X^2 + C_{33} Y^4 |X^3| + C_{34} Y^3 X^4 + C_{35} Y^2 |X^5| + C_{36} YX^6 + C_{37}|X^7| \quad (c)$ It should be noted that an anamorphic surface or a toric surface is also usable as a surface having a rotationally asymmetric curved surface configuration.

Further, the present invention uses an optical path distributing part whereby an image light beam emitted from the image display device at a divergent exit angle is led to the left and right ocular parts as stated above, and does not use an optical path splitting optical element such as a half-mirror. Therefore, a bright image can be observed.

It is desirable for the optical path distributing part to have at least two pairs of reflecting surfaces for the left and right optical paths of the viewing optical system for the left and right eyes that are arranged so that the axial principal ray entering the optical path distributing part in the left optical path is not in the same plane as the axial principal ray exiting the optical path distributing part in the left optical path, and the axial principal ray entering the optical path distributing part in the right optical path is not in the same plane as the axial principal ray exiting the optical path distributing part in the right optical path.

This is the minimum requirement to be met in order to form the left and right optical paths of the optical path distributing part so that these optical paths are not in plane symmetry with each other but in 180-degree rotational symmetry with respect to only a normal line passing through the center of the image display device.

Further, it is desirable for the optical path distributing part to have at least two pairs of reflecting surfaces for the left and right optical paths of the viewing optical system for the left and right eyes that are arranged so that the axial principal ray exiting the optical path distributing part in the left optical path is approximately parallel to the axial principal ray exiting the optical path distributing part in the right optical path.

This is a condition necessary to satisfy in order to place the decentered optical path plane of the left ocular part and the decentered optical path plane of the right ocular part in approximately parallel to each other.

Further, it is desirable for the optical path distributing part to have at least one pair of rotationally asymmetric curved reflecting surfaces having the function of correcting decentration aberrations.

Further, it is desirable for the optical path distributing part to have at least two pairs of rotationally asymmetric curved reflecting surfaces having the function of correcting decentration aberrations.

Further, the arrangement may be such that the optical path distributing part has at least three pairs of reflecting surfaces for the left and right optical paths, and the at least three pairs of reflecting surfaces are rotationally asymmetric curved reflecting surfaces having the function of correcting decentration aberrations.

It should be noted that each of the left and right ocular parts and the optical path distributing part, which constitute the viewing optical system, may be formed from only reflecting mirrors. Alternatively, each of the left and right ocular parts and the optical path distributing part may be formed from a decentered prism. It is also possible to integrate together the left and right ocular parts and the three-dimensional optical path distributing part into an integrated decentered prism.

When the left and right ocular part and the optical path distributing part are formed from a left ocular prism, a right ocular prism and an optical path distributing prism, respectively, it is desirable for the optical path distributing prism to include the following surfaces: an entrance surface facing at least the image display device so that both an image light beam for forming a left optical path for the left eye and an image light beam for forming a right optical path for the right eye enter the prism through the entrance surface; a left exit surface through which the light beam of the left optical path exits the prism; at least three left reflecting surfaces disposed in the optical path between the entrance surface and the left exit surface to reflect the light beam of the left optical path within the prism; a right exit surface through which the light beam of the right optical path exits the prism; and at least three right reflecting surfaces disposed in the optical path between the entrance surface and the right exit surface to reflect the light beam of the right optical path within the prism. The optical path distributing prism should desirably be arranged so that the entering optical axis of the axial principal ray incident on the reflecting surface closest to the entrance surface among the left reflecting surfaces in the left optical path is not in the same plane as the exiting optical axis of the axial principal ray exiting the reflecting surface remotest from the entrance surface among the left reflecting surfaces, and the entering optical axis of the axial principal ray incident on the reflecting surface closest to the entrance surface among the right reflecting surfaces in the right optical path is not in the same plane as the exiting optical axis of the axial principal ray exiting the reflecting surface remotest from the entrance surface among the right reflecting surfaces.

This arrangement is the minimum requirement to be met in order to form the left and right optical paths of the optical path distributing prism so that these optical paths are not in plane symmetry with each other but in 180-degree rotational symmetry with respect to only a normal line passing through the center of the image display device, as in the case of the above.

Further, the reflecting surface closest to the entrance surface in the left optical path and the reflecting surface closest to the entrance surface in the right optical path may be positioned adjacent to each other so as to face both the image display device and the entrance surface.

In this case, it is desirable that the optical path distributing prism should be provided with an anti-reflection member for an area including the boundary portion between the left and right reflecting surfaces closest to the entrance surface in the respective optical paths to prevent light rays emitted perpendicularly from the central region of the image display device from being reflected as ghost light.

Further, it is desirable that a distributed light reinforcing member should be disposed between the image display device and the optical path distributing part so that the light intensity of an image light beam emitted at a predetermined exit angle from each pixel located at least in the central portion of the single image display device is made higher by the distributed light reinforcing member than the intensity of a light beam emitted in a direction perpendicular to the surface of the pixel.

When the viewing optical system is formed from an optical path distributing prism and left and right ocular prisms, both the left and right ocular prisms may be arranged so that each ocular prism has, in order from the optical path distributing prism side, an entrance surface, a first reflecting surface, a second reflecting surface, and an exit surface, and the first reflecting surface and the exit surface are formed from the identical surface, and further the first reflecting surface is a reflecting surface using total reflection at the surface.

In this case, the entrance surface of each of the left and right ocular prisms may be formed from a rotationally asymmetric curved surface that corrects decentration aberrations, and the rotationally asymmetric curved surface may be a free-form surface having only one plane of symmetry.

Further, the second reflecting surface of each of the left and right ocular prisms may be formed from a rotationally asymmetric curved surface that corrects decentration aberrations, and the rotationally asymmetric curved surface may be a free-form surface having only one plane of symmetry.

Further, it is desirable to arrange the viewing optical system so that a relay image of the image displayed by the image display device is formed in the right optical path for the right eye and a relay image of the image displayed by the image display device is formed in the left optical path for the left eye.

Further, the image display device may be rotated through a desired angle about the normal line passing through the center of the image display device as an axis of rotation so that the horizontal direction of the image display area of the image display device is at an angle to a plane containing the exiting optical axes of the left and right axial principal rays exiting the optical path distributing part.

Further, it is desirable to satisfy the following condition:

$$20°<\theta<150° \quad (1)$$

where $\theta$ is the angle formed between the axial principal rays of left and right light beams led from each pixel located at least in the central portion of the image display device to the left and right eyes of the observer.

The condition (1) needs to be satisfied in order to separate the image light beams for the two eyes appropriately. If $\theta$ is not larger than the lower limit, i.e. 20°, the effective diameter areas of the left and right optical surfaces, particularly those of the left and right first reflecting surfaces of the optical path distributing part that are closest to the image display device, undesirably overlap each other. Accordingly, the optical system has to be increased in size in order to ensure the required effective diameter areas and hence becomes unsuitable for use as the optical system of a head- or face-mounted image display apparatus. Conversely, if $\theta$ is not smaller than the upper limit, i.e. 150°, an image display device having very wide viewing angle characteristics is needed. At the same time, the solid angle of the image light beam becomes small. As a result, it becomes impossible to observe a bright image. Regarding the angle $\theta$, it is preferable to satisfy the following condition:

$$25°<\theta<120° \quad (1-1)$$

The above-described image display apparatus can be used as an image pickup apparatus in which an image pickup device is provided in place of the image display device in the above-described arrangement. In this case, the pupil is arranged as an entrance pupil through which a light beam from a subject passes, and a subject image is formed on the image pickup device.

Further, the image display apparatus can be used as a projection apparatus in which a projection object is provided in place of the image display device in the foregoing arrangement. A screen is placed in front of the pupil to form a projected image of the projection object on the screen.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is a diagram showing mainly optical surfaces and optical paths in an optical system of an image display apparatus according to Example 1 of the present invention.

FIG. 3 is a diagram showing mainly optical surfaces and optical paths in an optical system of an image display apparatus according to Example 3 of the present invention.

DESCRIPTION OF THE PREFERRED EMBODIMENTS

Figure 2A:
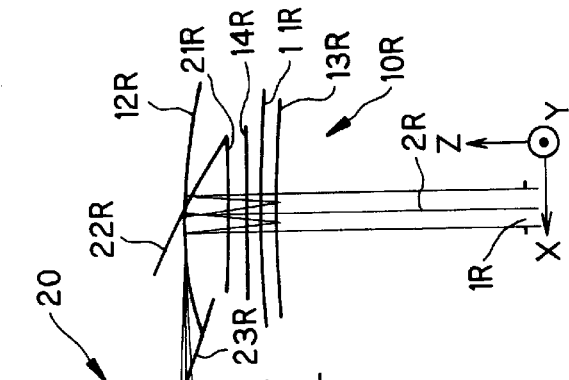
FIG. 2 is a diagram showing mainly optical surfaces and optical paths in an optical system of an image display apparatus according to Example 2 of the present invention.
Figure 2B:
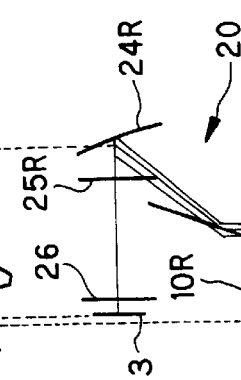
Figure 2C:
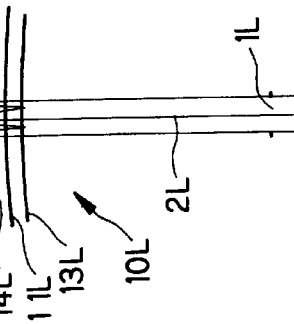
Figure 2D:
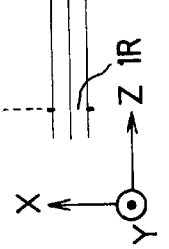

The image display apparatus having a three-dimensionally decentered optical path according to the present invention will be described below on the basis of Examples.

A coordinate system used in the following Examples is defined as follows. The direction of the observer's visual axis (forward direction) is defined as a Z-axis. The horizontal direction of the observer is defined as an X-axis, and the vertical direction of the observer is defined as a Y-axis.

In numerical data in each Example (shown later), data obtained by backward ray tracing from left and right pupils 1L and 1R to an image display device (image plane) 3 is shown. The following description of the arrangement will also be made in the order of backward ray tracing. The surface Nos. correspond to the surface Nos. in the numerical data concerning each Example.

In the following Examples 1 to 3, ocular prisms 10L and 10R are two-dimensionally decentered prisms, and an optical path distributing prism 20 is a three-dimensionally decentered prism. Left and right optical paths in the ocular prisms 10L and 10R are in plane symmetric relation to each other with respect to the plane of symmetry between the two eyes (i.e. a plane passing through the center of a straight line connecting the left and right pupils 1L and 1R at right angles to the straight line). The left and right optical paths exiting the ocular prisms 10L and 10R are in 180-degree rotational symmetry (rotationally symmetric relation) with respect to a normal line passing through the center of the image display device 3.

FIG. 1 is a diagram mainly showing optical surfaces and optical paths in the optical system of an image display apparatus according to Example 1. In the figure, part (a) is a side view of an optical path for the right eye as seen from the negative direction of the X-axis. Part (b) is a rear view of the optical path for the right eye as seen from the negative direction of the Z-axis. Part (c) is a plan view of the optical path for the right eye as seen from the positive direction of the Y-axis. Part (d) is a plan view of the optical paths for both eyes as seen from the positive direction of the Y-axis. To distinguish between the left and right optical surfaces, axial principal rays and pupils, "L" and "R" are suffixed to reference symbols. The reference symbols are put to the constituent elements in the order of backward ray tracing to match with the description of numerical data (shown later). The same shall apply to the other examples.

The optical path for the right eye in Example 1 will be described. The axial principal ray (optical axis) 2R in the backward ray tracing emerges from the pupil 1R where the pupil of the observer's right eye is to be positioned in a case where the image display apparatus is arranged as a head-mounted image display apparatus. The axial principal ray 2R enters the right ocular prism 10R while being refracted through a first surface 11R of the ocular prism 10R. The surface 11R also serves as a third surface 13R (totally reflecting surface). Then, the axial principal ray 2R is internally reflected by a second surface 12R and incident on the third surface 13R at an angle exceeding the critical angle. Consequently, the axial principal ray 2R is totally reflected by the third surface 13R and exits the right ocular prism 10R while being refracted through a fourth surface 14R. Then, the axial principal ray 2R enters the optical path distributing prism 20 while being refracted through a first surface 21R for the right eye. The axial principal ray 2R is internally reflected successively by second to sixth surfaces 22R to 26R for the right eye. Then, the axial principal ray 2R exits the optical path distributing prism 20 while being refracted through a seventh surface 27 shared between the left and right eyes. Then, the axial principal ray 2R reaches the image display device 3. In the numerical data (shown later), the right ocular prism 10R comprises the surface Nos. 2 to 5. Regarding the arrangement of the optical path distributing prism 20, the entrance surface is the surface No. 7, and the exit surface is the surface No. 13. The surface Nos. 8 to 12 are reflecting surfaces. The surface No. 6 is a hypothetic plane. The optical path formed between the surface No. 1 and the hypothetic plane is in plane symmetry with respect to a plane passing through the center of a straight line connecting the left and right pupils 1L and 1R at right angles to the straight line. The optical path formed between the hypothetic plane and the surface No. 13 is in 180-degree rotational symmetry with respect to a normal line passing through the center of the image display device 3.

The optical path for the left eye in Example 1 will be described. The optical path for the left eye is similar to the above, but "L" is suffixed to the reference symbols in place of "R". It should be noted, however, that the axial principal ray 2L exiting the left ocular prism 10L is reflected by a first reflecting surface 22L of the optical path distributing prism 20, which is a surface (surface No. 8) rotated about the Y-axis in the opposite direction to the corresponding surface for the right eye. Thereafter, the axial principal ray 2L travels along an optical path defined by the hypothetic plane (surface No. 6) rotated through 180° about the Z-axis with respect to the optical path for the right eye and reaches the image display device 3. In other words, the left and right optical paths formed between the respective hypothetic planes and the image display device 3 are in 180-degree rotational relation to each other about the Z-axis with respect to a normal line passing through the center of the image display device 3 [in the numerical data (shown later), the values β regarding the surface Nos. 7 and the following in the left and right optical paths are opposite in sign to each other; α (left)=α (right)±180°; γ (left) =γ (right)+180°].

With the above-described arrangement, the image of a single image display device can be observed with both eyes. Accordingly, the costs can be reduced extremely. Further, because no half-mirror is used, a bright image can be observed. In addition, the viewing optical system has seven reflecting surfaces as a whole, and the intermediate image (relay image) is formed between the first surface 21R(L) and the second surface 22R(L) of the optical path distributing prism 20. Therefore, the required back focus can be ensured even when the viewing optical system is required to have a shortened focal length. Accordingly, it is possible to provide a viewing optical system of wide field angle. Further, the ocular prism 10R(L) is decentered in the vertical direction (YZ-plane), and the image display apparatus has a three-dimensionally decentered structure as a whole. Therefore, it is possible to ensure a long optical path from the image display device 3 to the relay image, and the power set for each surface of the optical path distributing prism 20 can be weakened. Accordingly, it is possible to provide a high-performance viewing optical system compatible with a high-definition image display device 3.

Figure 11:
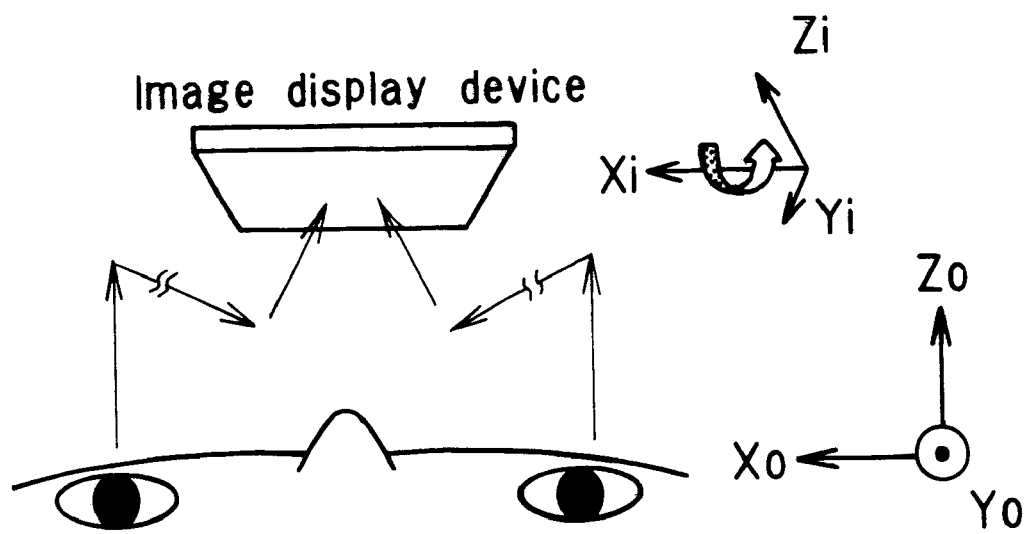
FIG. 11 is an image view showing the placement of an image display device in an image display apparatus formed by using bilaterally symmetric three-dimensional optical paths.
Figure 12:
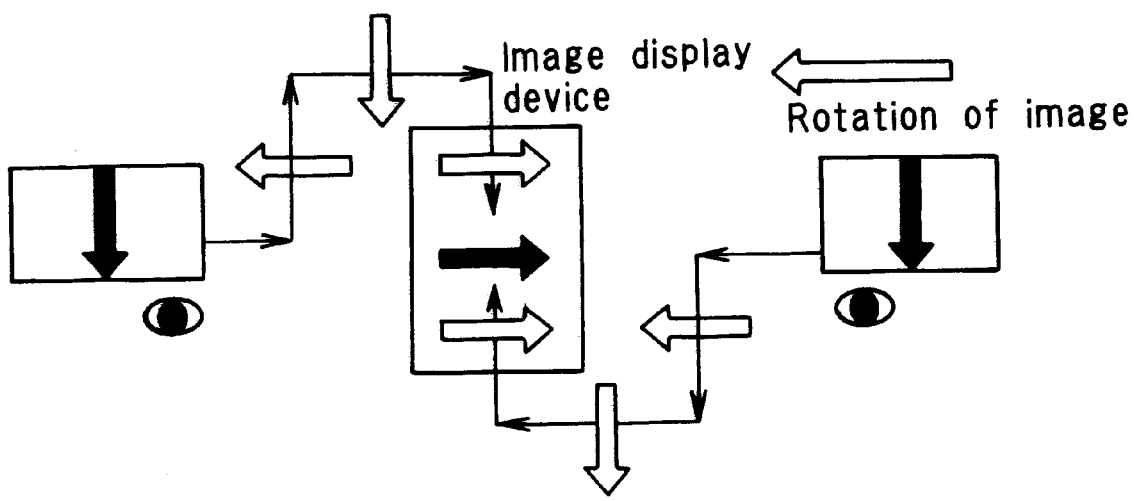
FIG. 12 is an image view showing the arrangement of an optical path distributing prism in Examples 1 and 2.

When the optical systems for the left and right eyes are in plane symmetry with respect to the plane of symmetry between the two eyes, the image display device can be placed only in a horizontal position [assuming that the coordinate system on the device is $(X_i,Y_i,Z_i)$, only the rotation about $X_i$ can be made] (FIG. 11). However, because the ocular prisms 10R and 10L for the two eyes are plane symmetric optical systems and the optical path distributing prism 20 is a rotationally symmetric optical system, even if the image display device 3 is rotated about a line normal to the image display device 3, observation can be performed with both eyes (i.e. rotation can be made about the $X_i$-axis and also about the $Z_i$-axis). Accordingly, the design freedom increases, and hence a high-performance viewing optical system can be provided. In this Example, the image display device 3 can be placed in a vertical position (FIG. 12) instead of being placed in a horizontal position (i.e. the longitudinal direction of the image display device 3 is parallel to the horizontal direction of the observer). Accordingly, even when an image display device having an aspect ratio of 9:16 is used, interference between the surfaces can be prevented. At the same time, a compact image display apparatus can be provided.

FIG. 2 is a diagram similar to FIG. 1, showing Example 2. This Example corresponds to an example wherein the number of reflecting surfaces of the optical path distributing prism 20 is smaller than in Example 1 by one.

The optical path for the right eye in Example 2 will be described below. The axial principal ray (optical axis) 2R in the backward ray tracing emerges from the pupil 1R where the pupil of the observer's right eye is to be positioned. The axial principal ray 2R enters the right ocular prism 10R while being refracted through a first surface 11R of the ocular prism 10R. The surface 11R also serves as a third surface 13R (totally reflecting surface). Then, the axial principal ray 2R is internally reflected by a second surface 12R and incident on the third surface 13R at an angle exceeding the critical angle. Consequently, the axial principal ray 2R is totally reflected by the third surface 13R and exits the right ocular prism 10R while being refracted through a fourth surface 14R. Then, the axial principal ray 2R enters the optical path distributing prism 20 while being refracted through a first surface 21R for the right eye. The axial principal ray 2R is internally reflected successively by second to fifth surfaces 22R to 25R for the right eye. Then, the axial principal ray 2R exits the optical path distributing prism 20 while being refracted through a sixth surface 26 shared between the left and right eyes. Then, the axial principal ray 2R reaches the image display device 3. In the numerical data (shown later), the right ocular prism 10R comprises the surface Nos. 2 to 5. Regarding the arrangement of the optical path distributing prism 20, the entrance surface is the surface No. 7, and the exit surface is the surface No. 12. The surface Nos. 8 to 11 are reflecting surfaces. The surface No. 6 is a hypothetic plane. The optical path formed between the surface No. 1 and the hypothetic plane is in plane symmetry with respect to a plane passing through the center of a straight line connecting the left and right pupils 1L and 1R at right angles to the straight line. The optical path formed between the hypothetic plane and the surface No. 12 is in 180-degree rotational symmetry with respect to a normal line passing through the center of the image display device 3.

The optical path for the left eye in Example 2 will be described. The optical path for the left eye is similar to the above, but "L" is suffixed to the reference symbols in place of "R". It should be noted, however, that the axial principal ray 2L exiting the left ocular prism 10L is reflected by a first reflecting surface 22L of the optical path distributing prism 20, which is a surface (surface No. 8) rotated about the Y-axis in the opposite direction to the corresponding surface for the right eye. Thereafter, the axial principal ray 2L travels along an optical path defined by the hypothetic plane (surface No. 6) rotated through 180° about the Z-axis with respect to the optical path for the right eye and reaches the image display device 3. In other words, the left and right optical paths formed between the respective hypothetic planes and the image display device 3 are in 180-degree rotational relation to each other about the Z-axis with respect to a normal line passing through the center of the image display device 3 [in the numerical data (shown later), the values β regarding the surface Nos. 7 and the following in the left and right optical paths are opposite in sign to each other; α (left)=α (right)±180°; γ (left) =γ (right)±180°].

With the above-described arrangement, the image of a single image display device can be observed with both eyes. Accordingly, the costs can be reduced extremely. Further, because no half-mirror is used, a bright image can be observed. In addition, the viewing optical system has six reflecting surfaces as a whole, and the intermediate image (relay image) is formed between the first surface 21R(L) and the second surface 22R(L) of the optical path distributing prism 20. Therefore, the required back focus can be ensured even when the viewing optical system is required to have a shortened focal length. Accordingly, it is possible to provide a viewing optical system of wide field angle. Further, the ocular prism 10R(L) is decentered in the vertical direction (YZ-plane), and the image display apparatus has a three-dimensionally decentered structure as a whole. Therefore, it is possible to ensure a long optical path from the image display device 3 to the relay image, and the power set for each surface of the optical path distributing prism 20 can be weakened. Accordingly, it is possible to provide a high-performance viewing optical system compatible with a high-definition image display device 3.

When the optical systems for the left and right eyes are in plane symmetry with respect to the plane of symmetry between the two eyes, the image display device can be placed only in a horizontal position [assuming that the coordinate system on the device is $(X_i, Y_i, Z_i)$, only the rotation about $X_i$ can be made] (FIG. 11). However, because the ocular prisms 10R and 10L for the two eyes are plane symmetric optical systems and the optical path distributing prism 20 is a rotationally symmetric optical system, even if the image display device 3 is rotated about a line normal to the image display device 3, observation can be performed with both eyes (i.e. rotation can be made about the $X_i$-axis and also about the $Z_i$-axis). Accordingly, the design freedom increases, and hence a high-performance viewing optical system can be provided. In this Example, the image display device 3 can be placed in a vertical position (FIG. 12) instead of being placed in a horizontal position (i.e. the longitudinal direction of the image display device 3 is parallel to the horizontal direction of the observer). Accordingly, even when an image display device having an aspect ratio of 9:16 is used, interference between the surfaces can be prevented. At the same time, a compact image display apparatus can be provided.

Figure 4:
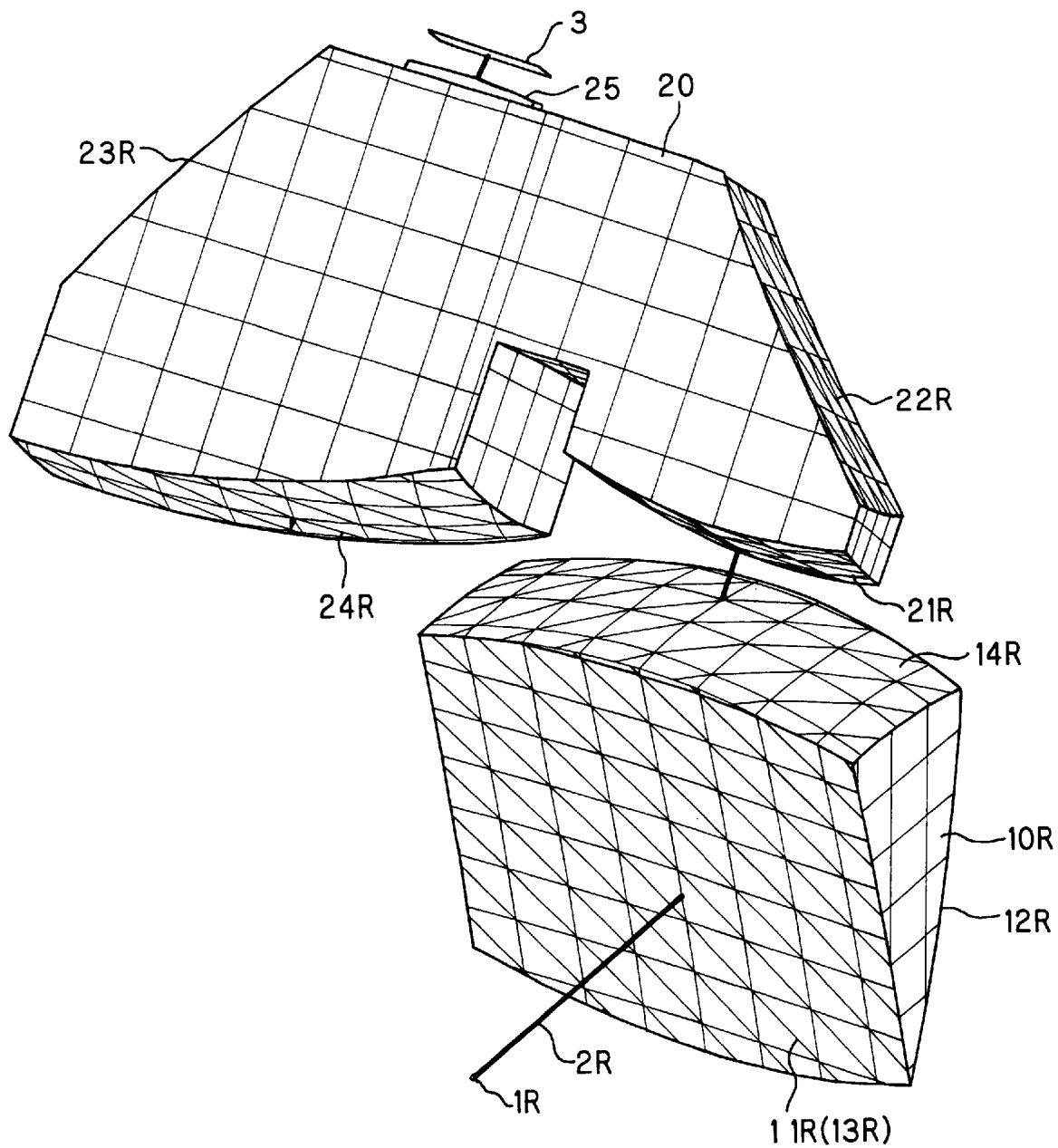
FIG. 4 is a perspective view of a part of the optical system for the right eye in the image display apparatus according to Example 3.
Figure 5:
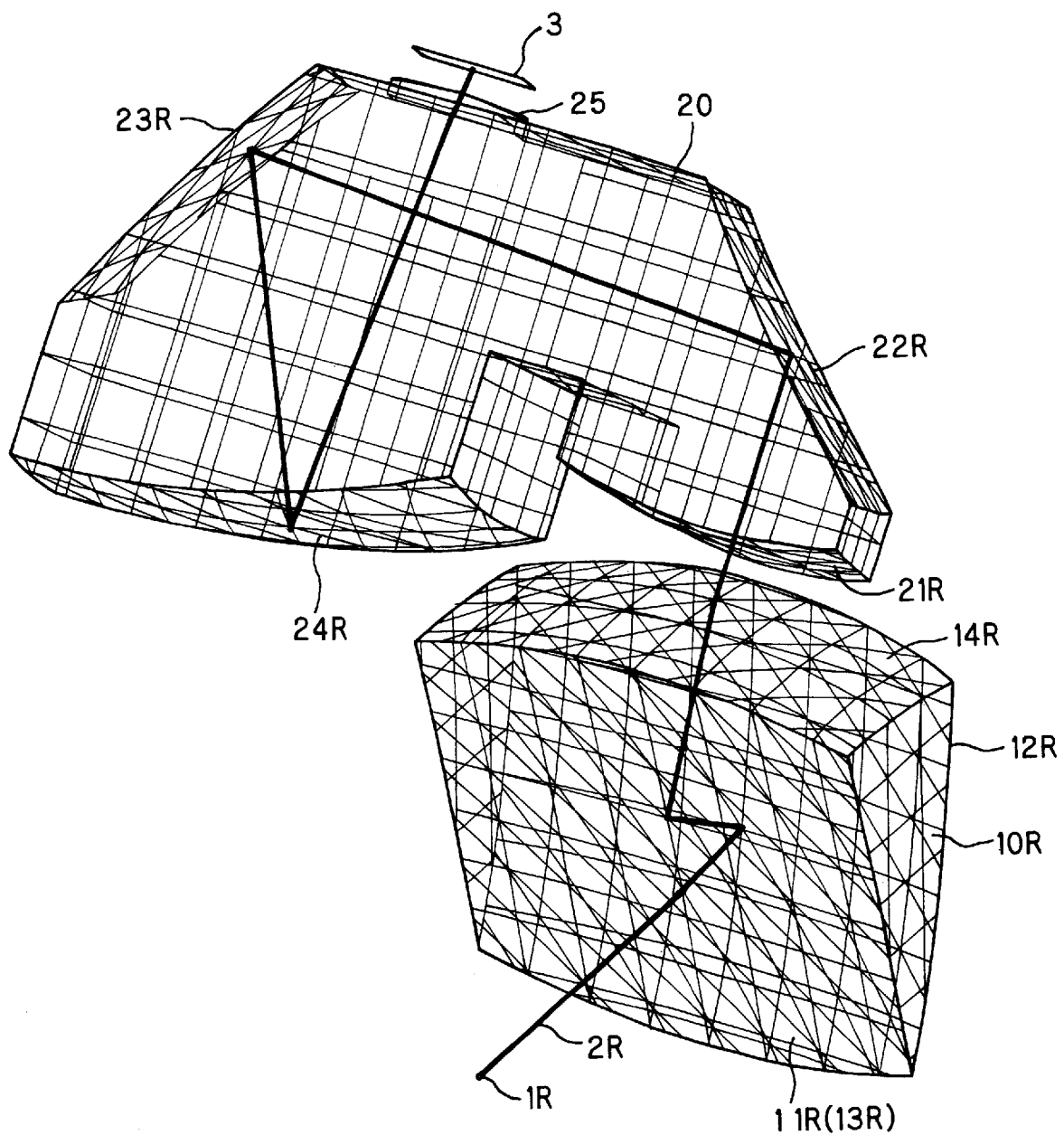
FIG. 5 is a see-through perspective view showing the axial principal ray in the part of the optical system for the right eye in Example 3.
Figure 6:
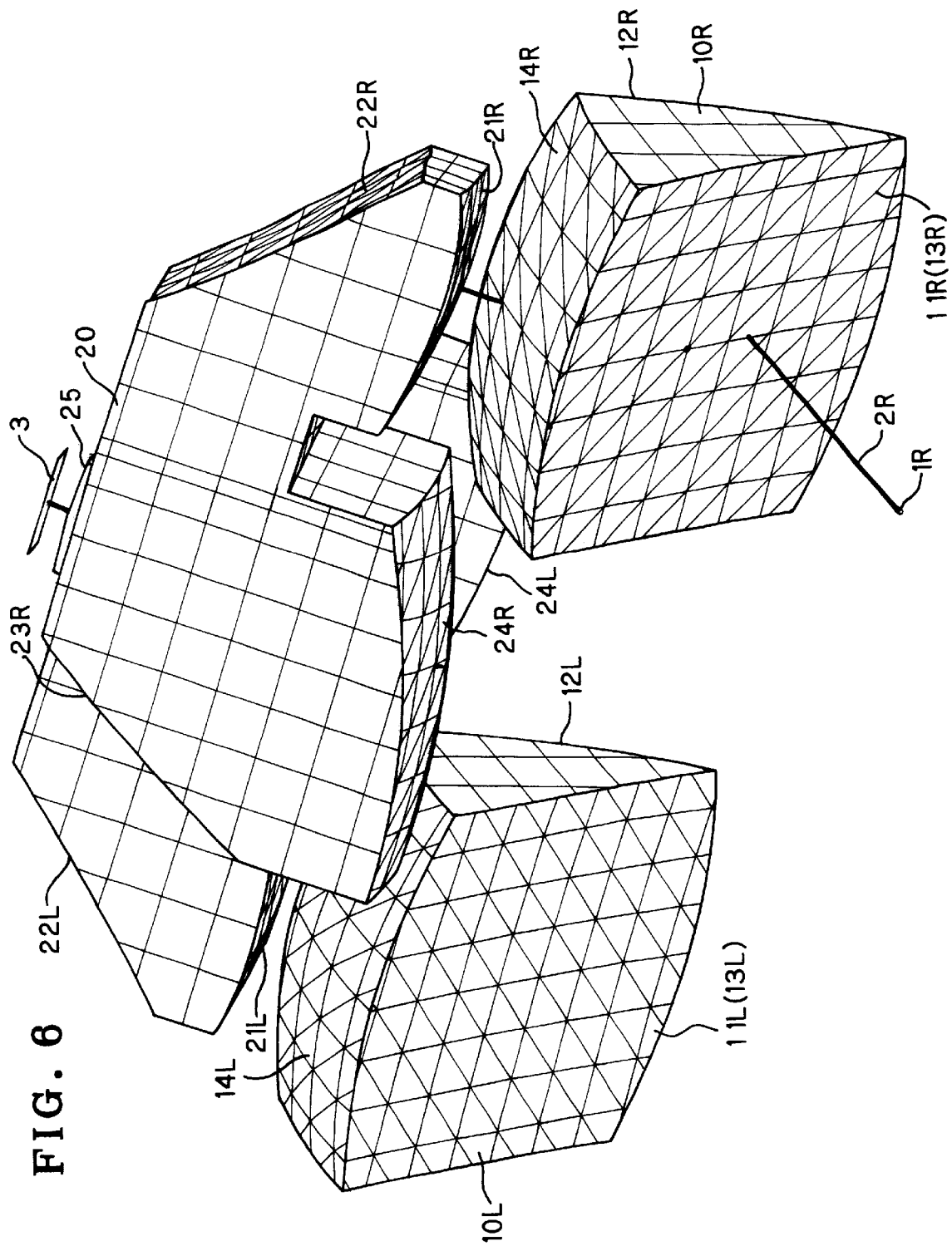
FIG. 6 is a perspective view corresponding to FIG. 4, showing optical systems for both eyes in the image display apparatus according to Example 3.
Figure 7:
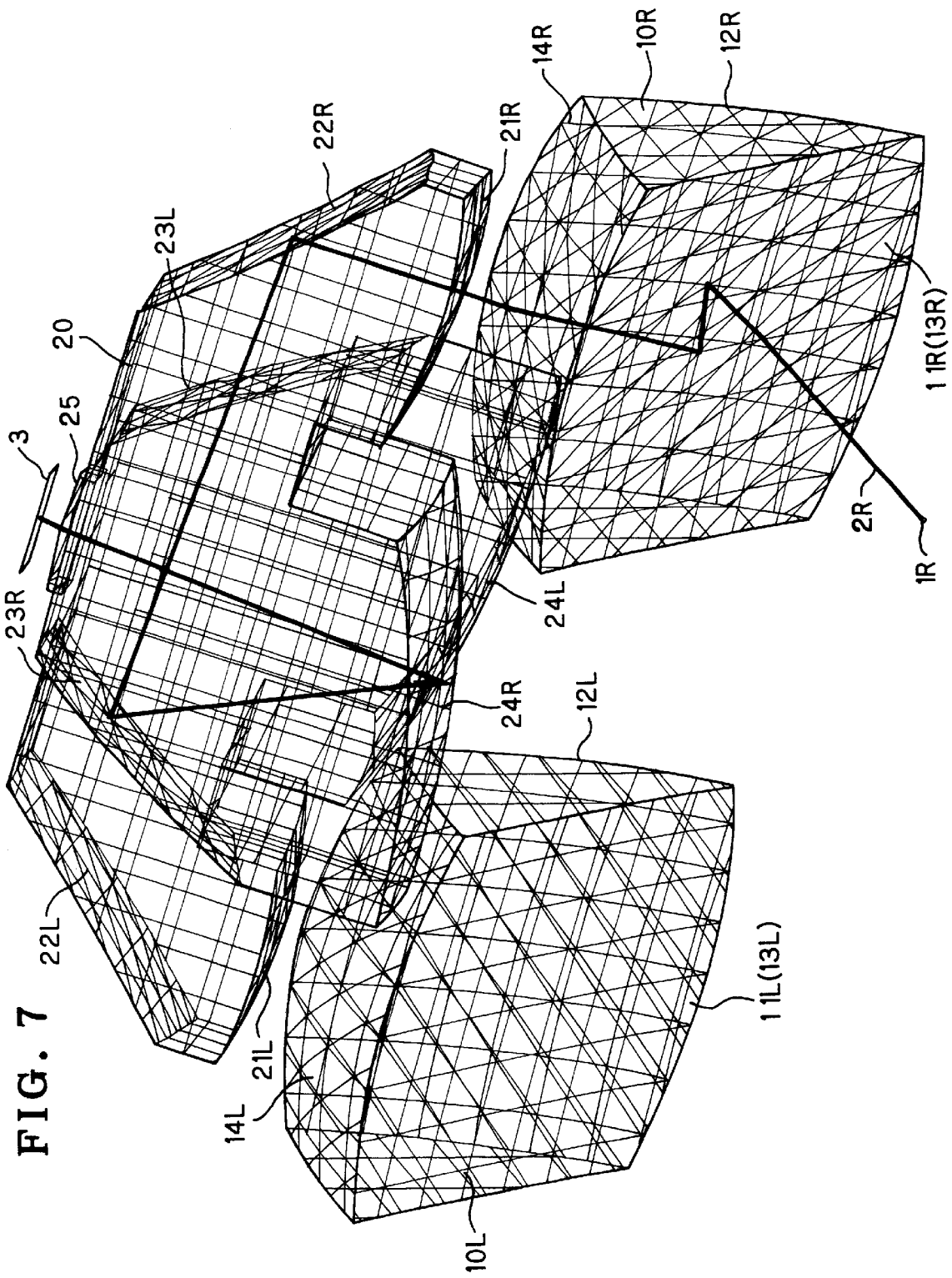
FIG. 7 is a see-through perspective view corresponding to FIG. 5, showing the axial principal ray for the right eye in the optical systems for both eyes in Example 3.

FIG. 3 is a diagram similar to FIG. 1, showing Example 3. FIG. 4 is a perspective view of a part of the optical system for the right eye in an image display apparatus according to Example 3. FIG. 5 is a see-through perspective view showing the axial principal ray 2R in the part of the optical system for the right eye in Example 3. FIG. 6 is a perspective view corresponding to FIG. 4, showing optical systems for both eyes in the image display apparatus according to Example 3. FIG. 7 is a see-through perspective view corresponding to FIG. 5, showing the axial principal ray 2R of the optical system for the right eye in the optical systems for both eyes in Example 3. It should be noted that in FIGS. 4 to 7, surfaces are expressed in the form of meshes. In this Example, the left and right optical paths of the optical path distributing prism 20 are formed from three pairs of reflecting surfaces.

The optical path for the right eye in Example 3 will be described below. The axial principal ray (optical axis) 2R in the backward ray tracing emerges from the pupil 1R where the pupil of the observer's right eye is to be positioned. The axial principal ray 2R enters the right ocular prism 10R while being refracted through a first surface 11R of the ocular prism 10R. The surface 11R also serves as a third surface 13R (totally reflecting surface). Then, the axial principal ray 2R is internally reflected by a second surface 12R and incident on the third surface 13R at an angle exceeding the critical angle. Consequently, the axial principal ray 2R is totally reflected by the third surface 13R and exits the right ocular prism 10R while being refracted through a fourth surface 14R. Then, the axial principal ray 2R enters the optical path distributing prism 20 while being refracted through a first surface 21R for the right eye. The axial principal ray 2R is internally reflected successively by second to fourth surfaces 22R to 24R for the right eye. Then, the axial principal ray 2R exits the optical path distributing prism 20 while being refracted through a fifth surface 25 shared between the left and right eyes. Then, the axial principal ray 2R reaches the image display device 3. In the numerical data (shown later), the right ocular prism 10R comprises the surface Nos. 2 to 5. Regarding the arrangement of the optical path distributing prism 20, the entrance surface is the surface No. 7, and the exit surface is the surface No. 11. The surface Nos. 8 to 10 are reflecting surfaces. The surface No. 6 is a hypothetic plane. The optical path formed between the surface No. 1 and the hypothetic plane is in plane symmetry with respect to a plane passing through the center of a straight line connecting the left and right pupils 1L and 1R at right angles to the straight line. The optical path formed between the hypothetic plane and the surface No. 11 is in 180-degree rotational symmetry with respect to a normal line passing through the center of the image display device 3.

The optical path for the left eye in Example 3 will be described. The optical path for the left eye is similar to the above, but "L" is suffixed to the reference symbols in place of "R". However, as will be understood from the numerical data (shown later), a comparison of the left and right optical paths as to the numerical data shown on the basis of the hypothetic plane (surface No. 6) reveals that the left and right optical paths differ only in that the hypothetic planes are 180° rotated relative to each other, and the values of the numerical data concerning the subsequent portions of the optical paths for the two eyes are coincident with each other. That is, in Example 3 also, the portions of the optical systems for the left and right eyes formed between the pupil 1R(L) and the respective hypothetic planes are in plane symmetry with each other, and the portions of the optical systems for the left and right eyes formed between the respective hypothetic planes and the image display device 3 are in rotational symmetry with each other.

With the above-described arrangement, the image of a single image display device can be observed with both eyes. Accordingly, the costs can be reduced extremely. Further, because no half-mirror is used, a bright image can be observed. In addition, the viewing optical system has five reflecting surfaces as a whole, and the intermediate image (relay image) is formed between the first surface 21R (L) and the second surface 22R (L) of the optical path distributing prism 20. Therefore, the required back focus can be ensured even when the viewing optical system is required to have a shortened focal length. Accordingly, it is possible to provide a viewing optical system of wide field angle. Further, the ocular prism 10R (L) is decentered in the vertical direction (YZ-plane), and the image display apparatus has a three-dimensionally decentered structure as a whole. Therefore, it is possible to ensure a long optical path from the image display device 3 to the relay image, and the power set for each surface of the optical path distributing prism 20 can be weakened. Accordingly, it is possible to provide a high-performance viewing optical system compatible with a high-definition image display device 3.

Figure 13:
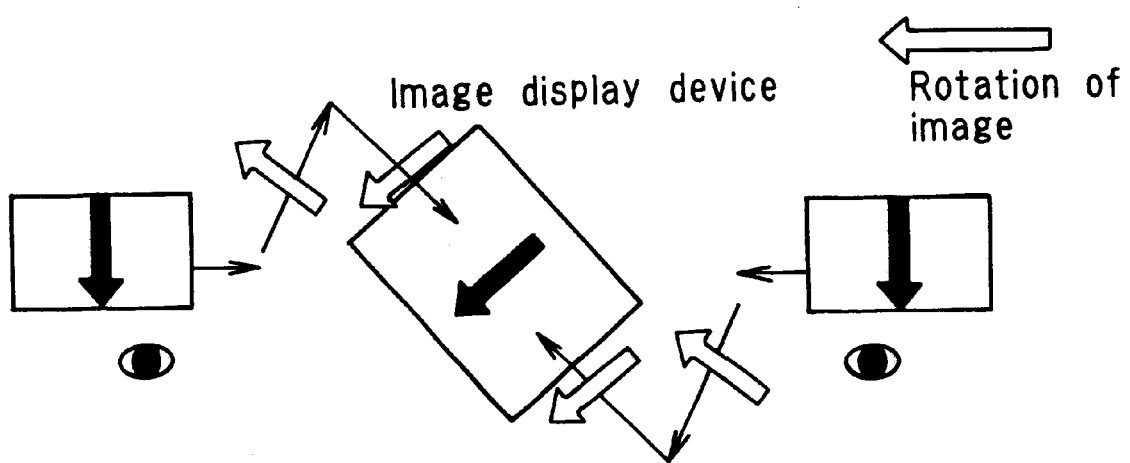
FIG. 13 is an image view showing the arrangement of an optical path distributing prism in Example 3.

When the optical systems for the left and right eyes are in plane symmetry with respect to the plane of symmetry between the two eyes, the image display device can be placed only in a horizontal position [assuming that the coordinate system on the device is $(X_i, Y_i, Z_i)$, only the rotation about $X_i$ can be made] (FIG. 11). However, because the ocular prisms 10R and 10L for the two eyes are plane symmetric optical systems and the optical path distributing prism 20 is a rotationally symmetric optical system, even if the image display device 3 is rotated about a line normal to the image display device 3, observation can be performed with both eyes (i.e. rotation can be made about the $X_i$-axis and also about the $Z_i$-axis). Accordingly, the design freedom increases, and hence a high-performance viewing optical system can be provided. In this Example, the image display device 3 can be placed obliquely with an angle of rotation about a normal line passing through the center of the image display device 3 (FIG. 13) instead of being placed in a horizontal position (i.e. the longitudinal direction of the image display device 3 is parallel to the horizontal direction of the observer).

Further, in this Example, the optical path distributing prism 20 can be formed from an extremely small number of three-dimensionally decentered reflecting surfaces, and it is possible to attain observation of a single image display device with both eyes at a wide field angle. Because the optical path distributing prism 20 has only three reflecting surfaces for each side, it is possible to attain an image display apparatus lower in cost and smaller in size than in Examples 1 and 2. In addition, all the coefficients of a free-form surface constituting each reflecting surface are used to construct a three-dimensional optical path having no plane of symmetry, thereby favorably correcting complicated decentration aberrations.

In all Examples 1 to 3, the ocular prism 10 (R, L) has, in order from the optical path distributing prism 20 side, an entrance surface 14 (R, L), a first reflecting surface 13 (R, L), a second reflecting surface 12 (R, L), and an exit surface 11 (R, L). The first reflecting surface 13 (R, L) and the exit surface 11 (R, L) are formed from the identical surface, and the first reflecting surface 13 (R, L) is a reflecting surface using total reflection at the surface. It should be noted, however, that any publicly known optical system may be used in place of the ocular prism as a modification of the described arrangement. For example, it is possible to use publicly known ocular prisms, concave mirrors, hologram optical elements, and so forth. The arrangement of each optical path in the optical path distributing prism 20 may also be modified. For example, the object of the present invention can also be attained by using a combination of a free-form surface mirror and a prism to divide the optical path distributing prism 20 into two. If the optical path distributing prism 20 is divided into a mirror and a prism, the size of the prism becomes small. Consequently, when it is formed by injection molding, the time required for molding can be shortened, and the costs can be reduced. The optical path distributing prism 20 may be made from two or three divided elements. In such a case also, the costs can be reduced for the reasons stated above.

Constituent parameters in the above-described Examples 1 to 3 will be shown below. In these numerical examples, the optical system for the right eye and the optical system for the left eye are described by surface Nos. along backward ray tracing from the pupils 1R and 1L. The optical paths from the pupils 1R and 1L to the hypothetic planes (surface No. 6) are in plane symmetric relation to each other with respect to the plane of symmetry between the two eyes. The optical paths from the hypothetic planes to the image display device 3 are in rotationally symmetric relation to each other with respect to a normal line passing through the center of the image display device 3. In other words, an optical path defined by the optical path for the right eye as rotated through 180° about a line normal to the hypothetic plane of the optical path for the right eye is the optical path for the left eye.

When the following Examples 1 to 3 are designed in the form of a viewing optical system, the viewing field angles are as follows. The horizontal half field angle is 17.5°, and the vertical half field angle is 13.3°. The size of the image display device 3 is 8.9×6.7 millimeters. The pupil diameter is 4 millimeters.

In the following constituent parameters in each Example, the axial principal ray 2R(L) is defined by a light ray passing perpendicularly through the center of the exit pupil 1R(L) of the optical system and reaching the center of the image display device 3 in the backward ray tracing. Further, in the backward ray tracing, the center of the pupil 1R(L) is defined as the origin of each decentered optical surface constituting a decentered optical system. The direction along which the axial principal ray 2R(L) travels until it intersects the first surface 11R(L) of the ocular prism 10 is defined as a Z-axis. The direction in which the Z-axis extends from the pupil 1R(L) toward the first surface 11R(L) is defined as a positive direction of the Z-axis. A plane in which the optical axis is folded within the ocular prism 10 is defined as a YZ-plane. An axis passing through the origin and perpendicularly intersecting the YZ-plane is defined as an X-axis. The direction in which the X-axis extends leftward in the horizontal direction is defined as a positive direction of the X-axis. An axis that constitutes a right-handed orthogonal coordinate system in combination with the X- and Z-axes is defined as a Y-axis. Accordingly, the direction in which the Y-axis extends upward in the vertical direction is a positive direction of the Y-axis.

Regarding decentered surfaces, each surface is given displacements in the X-, Y- and Z-axis directions (X, Y and Z, respectively) of the vertex position of the surface from the origin of the optical system, and tilt angles (degrees) of the center axis of the surface [the Z-axis of the above equation (a) in regard to free-form surfaces; the Z-axis of the following equation (d) in the case of aspherical surfaces] with respect to the X-, Y- and Z-axes ($\alpha$, $\beta$ and $\gamma$, respectively). In this case, the positive $\alpha$ and $\beta$ mean counterclockwise rotation relative to the positive directions of the corresponding axes, and the positive $\gamma$ means clockwise rotation relative to the positive direction of the Z-axis. It should be noted that the way of rotating the center axis of each surface through $\alpha$, $\beta$ and $\gamma$ is as follows. First, the center axis of the surface and the XYZ orthogonal coordinate system are rotated through $\alpha$ counterclockwise about the X-axis. Then, the rotated center axis of the surface is rotated through $\beta$ counterclockwise about the Y-axis of the new coordinate system, and the coordinate system once rotated is also rotated through $\beta$ counterclockwise about the Y-axis. Then, the center axis of the surface, which has been rotated twice, is rotated through $\gamma$ clockwise about the Z-axis of the new coordinate system.

Among optical functional surfaces constituting the optical system in each Example, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

Aspherical surfaces are rotationally symmetric aspherical surfaces given by the following equation:

$$Z=(y^2/R)/[1+\{1-(1+K)y^2/R^2\}^{1/2}]+Ay^4+By^6+Cy^8+Dy^{10}+ \quad (d)$$

In the above equation, Z is an optical axis (axial principal ray) for which the direction of travel of light is defined as a positive direction, and y is taken in a direction perpendicular to the optical axis. R is a paraxial curvature radius, and K is a conic constant. A, B, C, D . . . are 4th-, 6th-, 8th- and 10th-order aspherical coefficients, respectively. The Z-axis of this defining equation is the axis of the rotationally symmetric aspherical surface.

It should be noted that those terms concerning free-form surfaces and aspherical surfaces for which no data is shown are zero. The refractive index is expressed by the refractive index for the spectral d-line (wavelength: 587.56 nanometers). Lengths are given in millimeters.

It should be noted that, in the displacement data concerning Example 3, the values of displacement with respect to the surface No. 6 (hypothetic plane) are shown in the parentheses in the column for "Displacement and tilt (4)" and those subsequent thereto. The reason for this is as follows. All the reflecting surfaces (surface Nos. 8 to 10) have rotation angles $\alpha$ and $\beta$. Therefore, if data is shown on the basis of the pupil 1R(L), it is difficult to understand that the left and right optical systems are in rotational symmetry. For the surface No. 6 (hypothetic plane), when $\gamma=0$ (for the right eye) and $\gamma=180°$ (for the left eye), the displacement data on the left and right optical systems are coincident with each other.

In the tables showing constituent parameters below: "FFS" denotes a free-form surface; "ASS" denotes an aspherical surface; "HRP" denotes a hypothetic plane; and "RE" denotes a reflecting surface.

| (Example 1: Optical Path for Right Eye) | | | | | |
|---|---|---|---|---|---|
| Surface No. | Radius of curvature | Surface separation | Displacement and tilt | Refractive index | Abbe's No. |
| Object plane | ∞ | −1000.00 | | | |
| 1 | ∞ (Pupil) | | | | |
| 2 | ASS ① | | (1) | 1.5254 | 56.2 |
| 3 | FFS ① (RE) | | (2) | 1.5254 | 56.2 |
| 4 | ASS ① (RE) | | (1) | 1.5254 | 56.2 |
| 5 | FFS ② | | (3) | | |
| 6 | ∞ (HRP) | | (4) | | |
| 7 | FFS ③ | | (5) | 1.5254 | 56.2 |
| 8 | FFS ④ (RE) | | (6) | 1.5254 | 56.2 |
| 9 | FFS ⑤ (RE) | | (7) | 1.5254 | 56.2 |
| 10 | FFS ⑥ (RE) | | (8) | 1.5254 | 56.2 |
| 11 | FFS ⑦ (RE) | | (9) | 1.5254 | 56.2 |
| 12 | FFS ⑧ (RE) | | (10) | 1.5254 | 56.2 |
| 13 | ∞ | | (11) | | |
| Image plane | ∞ | | (12) | | |

ASS ①

R   −165.42
K    0.0000
A   −5.2477 × $10^{-7}$
B    5.9890 × $10^{-10}$

FFS ①

$C_4$  −9.0776 × $10^{-3}$   $C_6$  −8.8020 × $10^{-3}$   $C_8$   2.4862 × $10^{-5}$
$C_{10}$  4.5192 × $10^{-5}$   $C_{11}$ −1.1138 × $10^{-6}$   $C_{13}$  2.2393 × $10^{-6}$

-continued

| | | | | | |
|---|---|---|---|---|---|
| $C_{15}$ | $1.4980 \times 10^{-6}$ | $C_{17}$ | $6.2564 \times 10^{-9}$ | $C_{19}$ | $7.3888 \times 10^{-8}$ |
| $C_{21}$ | $4.9912 \times 10^{-8}$ | | | | |

FFS ②

| | | | | | |
|---|---|---|---|---|---|
| $C_4$ | $-2.5220 \times 10^{-4}$ | $C_6$ | $-5.6446 \times 10^{-3}$ | $C_8$ | $6.9828 \times 10^{-5}$ |
| $C_{10}$ | $-2.8905 \times 10^{-5}$ | $C_{11}$ | $7.7931 \times 10^{-6}$ | $C_{13}$ | $1.1521 \times 10^{-5}$ |
| $C_{17}$ | $-5.3841 \times 10^{-8}$ | $C_{19}$ | $-2.0288 \times 10^{-6}$ | | |

FFS ③

| | | | | |
|---|---|---|---|---|
| $C_4$ | $5.4743 \times 10^{-2}$ | $C_6$ | $3.0681 \times 10^{-2}$ | |

FFS ④

| | | | | | |
|---|---|---|---|---|---|
| $C_4$ | $8.5196 \times 10^{-3}$ | $C_8$ | $3.5633 \times 10^{-3}$ | $C_7$ | $2.9759 \times 10^{-5}$ |
| $C_9$ | $-1.4388 \times 10^{-4}$ | | | | |

FFS ⑤

| | | | | | |
|---|---|---|---|---|---|
| $C_4$ | $-3.5841 \times 10^{-4}$ | $C_6$ | $5.7576 \times 10^{-4}$ | $C_7$ | $-1.8029 \times 10^{-4}$ |
| $C_9$ | $-9.1964 \times 10^{-5}$ | | | | |

FFS ⑥

| | | | | | |
|---|---|---|---|---|---|
| $C_4$ | $-5.4682 \times 10^{-3}$ | $C_6$ | $-8.4242 \times 10^{-3}$ | $C_7$ | $-1.1006 \times 10^{-4}$ |
| $C_9$ | $-6.0334 \times 10^{-5}$ | | | | |

FFS ⑦

| | | | | | |
|---|---|---|---|---|---|
| $C_4$ | $4.2147 \times 10^{-3}$ | $C_6$ | $6.6151 \times 10^{-3}$ | $C_7$ | $6.4666 \times 10^{-8}$ |
| $C_9$ | $5.5288 \times 10^{-5}$ | | | | |

FFS ⑧

| | | | | |
|---|---|---|---|---|
| $C_4$ | $-1.8195 \times 10^{-3}$ | $C_6$ | $-6.6901 \times 10^{-5}$ | |

Displacement and tilt (1)

| X | 0.00 | Y | 7.22 | Z | 27.80 |
|---|---|---|---|---|---|
| α | 18.61 | β | 0.00 | γ | 0.00 |

Displacement and tilt (2)

| X | 0.00 | Y | 0.84 | Z | 38.64 |
|---|---|---|---|---|---|
| α | −12.47 | β | 0.00 | γ | 0.00 |

Displacement and tilt (3)

| X | 0.00 | Y | 18.30 | Z | 32.34 |
|---|---|---|---|---|---|
| α | 85.56 | β | 0.00 | γ | 0.00 |

Displacement and tilt (4)

| X | 0.00 | Y | 18.30 | Z | 32.34 |
|---|---|---|---|---|---|
| α | 57.70 | β | 0.00 | γ | 0.00 |

Displacement and tilt (5)

| X | 0.00 | Y | 19.99 | Z | 33.41 |
|---|---|---|---|---|---|
| α | 57.70 | β | 0.00 | γ | 0.00 |

Displacement and tilt (6)

| X | 0.00 | Y | 30.13 | Z | 39.82 |
|---|---|---|---|---|---|
| α | 57.70 | β | 45.00 | γ | 0.00 |

Displacement and tilt (7)

| X | 20.00 | Y | 30.13 | Z | 39.82 |
|---|---|---|---|---|---|
| α | 147.70 | β | −64.27 | γ | 0.00 |

Displacement and tilt (8)

| X | 6.15 | Y | 20.84 | Z | 54.52 |
|---|---|---|---|---|---|
| α | −32.30 | β | 64.27 | γ | 180.00 |

Displacement and tilt (9)

| X | 32.00 | Y | 20.84 | Z | 54.52 |
|---|---|---|---|---|---|
| α | 147.70 | β | 45.00 | γ | 0.00 |

Displacement and tilt (10)

| X | 32.00 | Y | 25.86 | Z | 46.58 |
|---|---|---|---|---|---|
| α | 92.30 | β | 0.00 | γ | 0.00 |

Displacement and tilt (11)

| X | 32.00 | Y | 14.65 | Z | 30.03 |
|---|---|---|---|---|---|
| α | 57.70 | β | 0.00 | γ | 0.00 |

Displacement and tilt (12)

| X | 32.00 | Y | 13.23 | Z | 29.13 |
|---|---|---|---|---|---|
| α | 57.70 | β | 0.00 | γ | 90.00 |

-continued (Example 1: Optical Path for Left Eye)

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS ① | | (1) | 1.5254 | 56.2 |
| 3 | FFS ① (RE) | | (2) | 1.5254 | 56.2 |
| 4 | ASS ① (RE) | | (1) | 1.5254 | 56.2 |
| 5 | FFS ② | | (3) | | |
| 6 | ∞ (HRP) | | (4) | | |
| 7 | FFS ③ | | (5) | 1.5254 | 56.2 |
| 8 | FFS ④ (RE) | | (6) | 1.5254 | 56.2 |
| 9 | FFS ⑤ (RE) | | (7) | 1.5254 | 56.2 |
| 10 | FFS ⑥ (RE) | | (8) | 1.5254 | 56.2 |
| 11 | FFS ⑦ (RE) | | (9) | 1.5254 | 56.2 |
| 12 | FFS ⑧ (RE) | | (10) | 1.5254 | 56.2 |
| 13 | ∞ | | (11) | | |
| Image plane | ∞ | | (12) | | |

ASS ①

| R | −165.42 |
|---|---|
| K | 0.0000 |
| A | $-5.2477 \times 10^{-7}$ |
| B | $5.9890 \times 10^{-10}$ |

FFS ①

| | | | | | |
|---|---|---|---|---|---|
| $C_4$ | $-9.0776 \times 10^{-3}$ | $C_8$ | $-8.8020 \times 10^{-3}$ | $C_8$ | $2.4862 \times 10^{-5}$ |
| $C_{10}$ | $4.5192 \times 10^{-5}$ | $C_{11}$ | $-1.1138 \times 10^{-8}$ | $C_{13}$ | $-2.2393 \times 10^{-8}$ |
| $C_{15}$ | $-1.4980 \times 10^{-6}$ | $C_{17}$ | $6.2564 \times 10^{-9}$ | $C_{19}$ | $7.3888 \times 10^{-8}$ |
| $C_{21}$ | $4.9912 \times 10^{-8}$ | | | | |

FFS ②

| | | | | | |
|---|---|---|---|---|---|
| $C_4$ | $-2.5220 \times 10^{-4}$ | $C_6$ | $-5.6446 \times 10^{-3}$ | $C_8$ | $6.9828 \times 10^{-5}$ |
| $C_{10}$ | $-2.8905 \times 10^{-5}$ | $C_{11}$ | $7.7931 \times 10^{-6}$ | $C_{13}$ | $1.1521 \times 10^{-5}$ |
| $C_{17}$ | $-5.3841 \times 10^{-8}$ | $C_{19}$ | $-2.0288 \times 10^{-8}$ | | |

FFS ③

| | | | | |
|---|---|---|---|---|
| $C_4$ | $5.4743 \times 10^{-2}$ | $C_8$ | $3.0681 \times 10^{-2}$ | |

FFS ④

| | | | | | |
|---|---|---|---|---|---|
| $C_4$ | $8.5196 \times 10^{-3}$ | $C_6$ | $3.5633 \times 10^{-3}$ | $C_7$ | $2.9759 \times 10^{-5}$ |
| $C_9$ | $-1.4388 \times 10^{-4}$ | | | | |

FFS ⑤

| | | | | | |
|---|---|---|---|---|---|
| $C_4$ | $-3.5841 \times 10^{-4}$ | $C_6$ | $5.7576 \times 10^{-4}$ | $C_7$ | $-1.8029 \times 10^{-4}$ |
| $C_9$ | $-9.1964 \times 10^{-5}$ | | | | |

FFS ⑥

| | | | | | |
|---|---|---|---|---|---|
| $C_4$ | $-5.4682 \times 10^{-3}$ | $C_6$ | $-8.4242 \times 10^{-3}$ | $C_7$ | $-1.1006 \times 10^{-4}$ |
| $C_9$ | $-6.0334 \times 10^{-5}$ | | | | |

FFS ⑦

| | | | | | |
|---|---|---|---|---|---|
| $C_4$ | $4.2147 \times 10^{-3}$ | $C_8$ | $6.6151 \times 10^{-3}$ | $C_7$ | $-6.4666 \times 10^{-8}$ |
| $C_9$ | $5.5288 \times 10^{-5}$ | | | | |

FFS ⑧

| | | | | |
|---|---|---|---|---|
| $C_4$ | $-1.8195 \times 10^{-3}$ | $C_6$ | $-6.6901 \times 10^{-5}$ | |

Displacement and tilt (1)

| X | 0.00 | Y | 7.22 | Z | 27.80 |
|---|---|---|---|---|---|
| α | 18.61 | β | 0.00 | γ | 0.00 |

Displacement and tilt (2)

| X | 0.00 | Y | 0.84 | Z | 38.64 |
|---|---|---|---|---|---|
| α | −12.47 | β | 0.00 | γ | 0.00 |

Displacement and tilt (3)

| X | 0.00 | Y | 18.30 | Z | 32.34 |
|---|---|---|---|---|---|
| α | 85.56 | β | 0.00 | γ | 0.00 |

-continued

Displacement and tilt (4)

| | | | | | |
|---|---|---|---|---|---|
| X | 0.00 | Y | 18.30 | Z | 32.34 |
| α | 57.70 | β | 0.00 | γ | 180.00 |

Displacement and tilt (5)

| | | | | | |
|---|---|---|---|---|---|
| X | 0.00 | Y | 19.99 | Z | 33.41 |
| α | 57.70 | β | 0.00 | γ | 180.00 |

Displacement and tilt (6)

| | | | | | |
|---|---|---|---|---|---|
| X | 0.00 | Y | 30.13 | Z | 39.82 |
| α | 57.70 | β | −45.00 | γ | 180.00 |

Displacement and tilt (7)

| | | | | | |
|---|---|---|---|---|---|
| X | −20.00 | Y | 30.13 | Z | 39.82 |
| α | −32.30 | β | 64.27 | γ | 180.00 |

Displacement and tilt (8)

| | | | | | |
|---|---|---|---|---|---|
| X | −6.15 | Y | 39.43 | Z | 25.12 |
| α | 147.70 | β | −64.27 | γ | 0.00 |

Displacement and tilt (9)

| | | | | | |
|---|---|---|---|---|---|
| X | −32.00 | Y | 39.43 | Z | 25.12 |
| α | −32.30 | β | −45.00 | γ | 180.00 |

Displacement and tilt (10)

| | | | | | |
|---|---|---|---|---|---|
| X | −32.00 | Y | 34.41 | Z | 33.06 |
| α | 23.10 | β | 0.00 | γ | 180.00 |

Displacement and tilt (11)

| | | | | | |
|---|---|---|---|---|---|
| X | −32.00 | Y | 14.65 | Z | 30.03 |
| α | 57.70 | β | 0.00 | γ | 180.00 |

Displacement and tilt (12)

| | | | | | |
|---|---|---|---|---|---|
| X | −32.00 | Y | 13.23 | Z | 29.13 |
| α | 57.70 | β | 0.00 | γ | 270.00 |

(Example 2: Optical Path for Right Eye)

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS ① | | (1) | 1.5254 | 56.2 |
| 3 | FFS ① (RE) | | (2) | 1.5254 | 56.2 |
| 4 | ASS ① (RE) | | (1) | 1.5254 | 56.2 |
| 5 | FFS ② | | (3) | | |
| 6 | ∞ (HRF) | | (4) | | |
| 7 | FFS ③ | | (5) | 1.5254 | 56.2 |
| 8 | FFS ④ (RE) | | (6) | 1.5254 | 56.2 |
| 9 | FFS ⑤ (RE) | | (7) | 1.5254 | 56.2 |
| 10 | FFS ⑥ (RE) | | (8) | 1.5254 | 56.2 |
| 11 | FFS ⑦ (RE) | | (9) | 1.5254 | 56.2 |
| 12 | ∞ | | (10) | | |
| Image plane | ∞ | | (11) | | |

ASS ①

R −165.42
K 0.0000
A −5.2477 × 10⁻⁷
B 5.9890 × 10⁻¹⁰

FFS ①

| | | | | | |
|---|---|---|---|---|---|
| $C_4$ | −9.0776 × 10⁻³ | $C_6$ | −8.8020 × 10⁻³ | $C_8$ | 2.4862 × 10⁻⁵ |
| $C_{10}$ | 4.5192 × 10⁻⁵ | $C_{11}$ | 1.1138 × 10⁻⁶ | $C_{13}$ | −2.2393 × 10⁻⁶ |
| $C_{15}$ | −1.4980 × 10⁻⁶ | $C_{17}$ | 6.2564 × 10⁻⁹ | $C_{19}$ | 7.3888 × 10⁻⁸ |
| $C_{21}$ | 4.9912 × 10⁻⁸ | | | | |

FFS ②

| | | | | | |
|---|---|---|---|---|---|
| $C_4$ | −2.5220 × 10⁻⁴ | $C_6$ | −5.6446 × 10⁻³ | $C_8$ | 6.9828 × 10⁻⁵ |
| $C_{10}$ | −2.8905 × 10⁻⁵ | $C_{11}$ | 7.7931 × 10⁻⁶ | $C_{13}$ | 1.1521 × 10⁻⁵ |
| $C_{17}$ | −5.3841 × 10⁻⁸ | $C_{19}$ | −2.0288 × 10⁻⁶ | | |

FFS ③

| | | | |
|---|---|---|---|
| $C_4$ | 4.3215 × 10⁻³ | $C_6$ | 3.6634 × 10⁻² |

FFS ④

| | | | | | |
|---|---|---|---|---|---|
| $C_4$ | −3.7250 × 10⁻³ | $C_6$ | 7.8829 × 10⁻³ | $C_7$ | −1.7314 × 10⁻⁵ |
| $C_9$ | 2.3703 × 10⁻⁴ | | | | |

FFS ⑤

| | | | | | |
|---|---|---|---|---|---|
| $C_4$ | −2.0794 × 10⁻³ | $C_6$ | 6.6243 × 10⁻³ | $C_7$ | −1.3561 × 10⁻⁵ |
| $C_9$ | −1.7459 × 10⁻⁴ | | | | |

FFS ⑥

| | | | | | |
|---|---|---|---|---|---|
| $C_4$ | −1.1990 × 10⁻² | $C_6$ | −1.5233 × 10⁻² | $C_7$ | −1.2519 × 10⁻⁴ |
| $C_9$ | −8.0694 × 10⁻⁵ | | | | |

FFS ⑦

| | | | |
|---|---|---|---|
| $C_4$ | −8.9616 × 10⁻⁴ | $C_8$ | −1.6696 × 10⁻³ |

Displacement and tilt (1)

| | | | | | |
|---|---|---|---|---|---|
| X | 0.00 | Y | 7.22 | Z | 27.80 |
| α | 18.61 | β | 0.00 | γ | 0.00 |

Displacement and tilt (2)

| | | | | | |
|---|---|---|---|---|---|
| X | 0.00 | Y | 0.84 | Z | 38.64 |
| α | −12.47 | β | 0.00 | γ | 0.00 |

Displacement and tilt (3)

| | | | | | |
|---|---|---|---|---|---|
| X | 0.00 | Y | 18.30 | Z | 32.34 |
| α | 85.56 | β | 0.00 | γ | 0.00 |

Displacement and tilt (4)

| | | | | | |
|---|---|---|---|---|---|
| X | 0.00 | Y | 18.30 | Z | 32.34 |
| α | 57.70 | β | 0.00 | γ | 0.00 |

Displacement and tilt (5)

| | | | | | |
|---|---|---|---|---|---|
| X | 0.00 | Y | 20.31 | Z | 33.61 |
| α | 57.70 | β | 0.00 | γ | 0.00 |

Displacement and tilt (6)

| | | | | | |
|---|---|---|---|---|---|
| X | 0.00 | Y | 28.44 | Z | 38.75 |
| α | 57.70 | β | 45.00 | γ | 0.00 |

Displacement and tilt (7)

| | | | | | |
|---|---|---|---|---|---|
| X | 20.00 | Y | 28.44 | Z | 38.75 |
| α | 147.70 | β | −22.50 | γ | 0.00 |

Displacement and tilt (8)

| | | | | | |
|---|---|---|---|---|---|
| X | 32.00 | Y | 22.03 | Z | 48.89 |
| α | −32.30 | β | −22.50 | γ | 180.00 |

Displacement and tilt (9)

| | | | | | |
|---|---|---|---|---|---|
| X | 32.00 | Y | 25.77 | Z | 42.98 |
| α | 95.80 | β | 0.00 | γ | 0.00 |

Displacement and tilt (10)

| | | | | | |
|---|---|---|---|---|---|
| X | 32.00 | Y | 14.80 | Z | 30.13 |
| α | 57.70 | β | 0.00 | γ | 0.00 |

Displacement and tilt (11)

| | | | | | |
|---|---|---|---|---|---|
| X | 32.00 | Y | 13.23 | Z | 29.13 |
| α | 57.70 | β | 0.00 | γ | 90.00 |

(Example 2: Optical Path for Left Eye)

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS ① | | (1) | 1.5254 | 56.2 |
| 3 | FFS ① (RE) | | (2) | 1.5254 | 56.2 |
| 4 | ASS ① (RE) | | (1) | 1.5254 | 56.2 |
| 5 | FFS ② | | (3) | | |
| 6 | ∞ (HRP) | | (4) | | |
| 7 | FFS ③ | | (5) | 1.5254 | 56.2 |
| 8 | FFS ④ (RE) | | (6) | 1.5254 | 56.2 |

-continued

| 9 | FFS ⑤ (RE) | (7) | 1.5254 | 56.2 |
| 10 | FFS ⑥ (RE) | (8) | 1.5254 | 56.2 |
| 11 | FFS ⑦ (RE) | (9) | 1.5254 | 56.2 |
| 12 | ∞ | (10) | | |
| Image plane | ∞ | (11) | | |

ASS ①

R  −165.42
K   0.0000
A  −5.2477 × $10^{-7}$
B   5.9890 × $10^{-10}$

FFS ①

| $C_4$ | −9.0776 × $10^{-3}$ | $C_6$ | −8.8020 × $10^{-3}$ | $C_8$ | 2.4862 × $10^{-5}$ |
| $C_{10}$ | 4.5192 × $10^{-5}$ | $C_{11}$ | −1.1138 × $10^{-8}$ | $C_{13}$ | −2.2393 × $10^{-6}$ |
| $C_{15}$ | −1.4980 × $10^{-8}$ | $C_{17}$ | 6.2564 × $10^{-9}$ | $C_{19}$ | 7.3888 × $10^{-8}$ |
| $C_{21}$ | 4.9912 × $10^{-8}$ | | | | |

FFS ②

| $C_4$ | −2.5220 × $10^{-4}$ | $C_6$ | −5.6446 × $10^{-3}$ | $C_8$ | 6.9828 × $10^{-5}$ |
| $C_{10}$ | −2.8905 × $10^{-5}$ | $C_{11}$ | 7.7931 × $10^{-6}$ | $C_{13}$ | 1.1521 × $10^{-5}$ |
| $C_{17}$ | −5.3841 × $10^{-8}$ | $C_{19}$ | −2.0288 × $10^{-6}$ | | |

FFS ③

| $C_4$ | 4.3215 × $10^{-3}$ | $C_8$ | 3.6634 × $10^{-2}$ | | |

FFS ④

| $C_4$ | −3.7250 × $10^{-3}$ | $C_6$ | 7.8829 × $10^{-3}$ | $C_7$ | −1.7314 × $10^{-5}$ |
| $C_9$ | 2.3703 × $10^{-4}$ | | | | |

FFS ⑤

| $C_4$ | −2.0794 × $10^{-3}$ | $C_6$ | 6.6243 × $10^{-3}$ | $C_7$ | −1.3561 × $10^{-5}$ |
| $C_9$ | −1.7459 × $10^{-4}$ | | | | |

FFS ⑥

| $C_4$ | −1.1990 × $10^{-2}$ | $C_8$ | −1.5233 × $10^{-2}$ | $C_7$ | −1.2519 × $10^{-4}$ |
| $C_9$ | −8.0694 × $10^{-5}$ | | | | |

FFS ⑦

| $C_4$ | −8.9616 × $10^{-4}$ | $C_6$ | −1.6696 × $10^{-3}$ | | |

Displacement and tilt (1)

| X | 0.00 | Y | 7.22 | Z | 27.80 |
| α | 18.61 | β | 0.00 | γ | 0.00 |

Displacement and tilt (2)

| X | 0.00 | Y | 0.84 | Z | 38.64 |
| α | −12.47 | β | 0.00 | γ | 0.00 |

Displacement and tilt (3)

| X | 0.00 | Y | 18.30 | Z | 32.34 |
| α | 85.56 | β | 0.00 | γ | 0.00 |

Displacement and tilt (4)

| X | 0.00 | Y | 18.30 | Z | 32.34 |
| α | 57.70 | β | 0.00 | γ | 180.00 |

Displacement and tilt (5)

| X | 0.00 | Y | 20.31 | Z | 33.61 |
| α | 57.70 | β | 0.00 | γ | 180.00 |

Displacement and tilt (6)

| X | 0.00 | Y | 28.44 | Z | 38.75 |
| α | 57.70 | β | −45.00 | γ | 180.00 |

Displacement and tilt (7)

| X | −20.00 | Y | 28.44 | Z | 38.75 |
| α | −32.30 | β | 22.50 | γ | 180.00 |

Displacement and tilt (8)

| X | −32.00 | Y | 34.86 | Z | 28.61 |
| α | 147.70 | β | 22.50 | γ | 0.00 |

-continued

Displacement and tilt (9)

| X | −32.00 | Y | 31.11 | Z | 34.52 |
| α | 19.60 | β | 0.00 | γ | 180.00 |

Displacement and tilt (10)

| X | −32.00 | Y | 14.80 | Z | 30.13 |
| α | 57.70 | β | 0.00 | γ | 180.00 |

Displacement and tilt (11)

| X | −32.00 | Y | 13.23 | Z | 29.13 |
| α | 57.70 | β | 0.00 | γ | 270.00 |

(Example 3: Optical Path for Right Eye)

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS ① | | (1) | 1.5254 | 56.2 |
| 3 | FFS ① (RE) | | (2) | 1.5254 | 56.2 |
| 4 | ASS ① (RE) | | (1) | 1.5254 | 56.2 |
| 5 | ASS ② | | (3) | | |
| 6 | ∞ (HRP) | | (4) | | |
| 7 | FFS ② | | (5) | 1.5254 | 56.2 |
| 8 | FFS ③ (RE) | | (6) | 1.5254 | 56.2 |
| 9 | FFS ④ (RE) | | (7) | 1.5254 | 56.2 |
| 10 | FFS ⑤ (RE) | | (8) | 1.5254 | 56.2 |
| 11 | ASS ③ | | (9) | | |
| Image plane | ∞ | | (10) | | |

ASS ①

R  −368.45
K   0.0000
A   4.5583 × $10^{-7}$
B  −1.5145 × $10^{-10}$

ASS ②

R  −48.92
K   0.0000
A   2.9667 × $10^{-6}$

ASS ③

R  −30.00
K   0.0000
A   4.2130 × $10^{-5}$

FFS ①

| $C_4$ | −7.4375 × $10^{-3}$ | $C_6$ | −6.4478 × $10^{-3}$ | $C_8$ | 3.6852 × $10^{-5}$ |
| $C_{10}$ | 3.8267 × $10^{-5}$ | $C_{11}$ | 1.2477 × $10^{-6}$ | $C_{13}$ | 2.5929 × $10^{-6}$ |
| $C_{15}$ | 9.3753 × $10^{-7}$ | $C_{17}$ | 2.7365 × $10^{-8}$ | $C_{19}$ | 2.3475 × $10^{-8}$ |
| $C_{21}$ | 4.5123 × $10^{-8}$ | | | | |

FFS ②

| $C_4$ | 1.2113 × $10^{-2}$ | $C_5$ | 4.3957 × $10^{-3}$ | $C_8$ | 1.7363 × $10^{-3}$ |
| $C_7$ | −6.7274 × $10^{-5}$ | | | | |

FFS ③

| $C_4$ | 2.7585 × $10^{-3}$ | $C_5$ | 2.2633 × $10^{-3}$ | $C_6$ | −2.1496 × $10^{-3}$ |
| $C_7$ | −1.2980 × $10^{-5}$ | $C_8$ | 2.4352 × $10^{-5}$ | $C_9$ | 1.2164 × $10^{-4}$ |
| $C_{10}$ | −1.4806 × $10^{-4}$ | $C_{11}$ | −3.1978 × $10^{-6}$ | $C_{12}$ | 3.4083 × $10^{-6}$ |
| $C_{13}$ | 3.7744 × $10^{-5}$ | $C_{14}$ | 3.4678 × $10^{-5}$ | $C_{15}$ | 4.5731 × $10^{-5}$ |
| $C_{16}$ | 1.9178 × $10^{-7}$ | $C_{17}$ | 1.0060 × $10^{-7}$ | $C_{18}$ | 1.9182 × $10^{-7}$ |
| $C_{19}$ | 1.0242 × $10^{-7}$ | $C_{21}$ | 3.9019 × $10^{-6}$ | | |

FFS ④

| $C_4$ | −3.8824 × $10^{-3}$ | $C_5$ | −4.4423 × $10^{-4}$ | $C_6$ | −3.8240 × $10^{-3}$ |
| $C_7$ | 8.2712 × $10^{-6}$ | $C_8$ | 1.9357 × $10^{-5}$ | $C_9$ | 3.0205 × $10^{-6}$ |
| $C_{10}$ | 2.7338 × $10^{-5}$ | $C_{11}$ | 1.7450 × $10^{-7}$ | $C_{12}$ | −1.8579 × $10^{-7}$ |
| $C_{13}$ | 1.5047 × $10^{-6}$ | $C_{14}$ | −1.0329 × $10^{-6}$ | $C_{15}$ | 1.2398 × $10^{-6}$ |
| $C_{16}$ | −8.5732 × $10^{-9}$ | $C_{17}$ | 5.3323 × $10^{-8}$ | $C_{18}$ | 1.6212 × $10^{-7}$ |
| $C_{19}$ | 1.3303 × $10^{-7}$ | $C_{21}$ | −1.7930 × $10^{-8}$ | | |

-continued

FFS ⑤

| $C_4$ | $7.7644 \times 10^{-3}$ | $C_5$ | $-6.4826 \times 10^{-6}$ | $C_6$ | $-6.0150 \times 10^{-3}$ |
|---|---|---|---|---|---|
| $C_7$ | $3.1011 \times 10^{-6}$ | $C_8$ | $-1.6971 \times 10^{-5}$ | $C_9$ | $7.0993 \times 10^{-6}$ |
| $C_{10}$ | $-2.2276 \times 10^{-5}$ | $C_{11}$ | $8.3257 \times 10^{-8}$ | $C_{12}$ | $-3.1221 \times 10^{-7}$ |
| $C_{13}$ | $-7.3208 \times 10^{-7}$ | $C_{14}$ | $-4.5097 \times 10^{-7}$ | $C_{15}$ | $-6.2018 \times 10^{-7}$ |
| $C_{16}$ | $-3.2268 \times 10^{-9}$ | $C_{17}$ | $3.5107 \times 10^{-8}$ | $C_{18}$ | $9.6470 \times 10^{-9}$ |
| $C_{19}$ | $5.0804 \times 10^{-9}$ | $C_{21}$ | $2.0644 \times 10^{-9}$ | | |

Displacement and tilt (1)

| X | -0.00 | Y | 7.33 | Z | 28.44 |
|---|---|---|---|---|---|
| α | 16.20 | β | 0.00 | γ | 0.00 |

Displacement and tilt (2)

| X | 0.00 | Y | 0.84 | Z | 39.60 |
|---|---|---|---|---|---|
| α | -12.47 | β | 0.00 | γ | 0.00 |

Displacement and tilt (3)

| X | 0.00 | Y | 22.17 | Z | 36.13 |
|---|---|---|---|---|---|
| α | 81.38 | β | 0.00 | γ | 0.00 |

Displacement and tilt (4)

| X | 0.00 | Y | 22.17 | Z | 36.13 |
|---|---|---|---|---|---|
| (X | 0.00 | Y | 22.17 | Z | 36.13) |
| α | 51.96 | β | 0.00 | γ | 0.00 |
| (α | 51.96 | β | 0.00 | γ | 0.00) |

Displacement and tilt (5)

| X | 0.00 | Y | 25.32 | Z | 38.60 |
|---|---|---|---|---|---|
| (X | 0.00 | Y | 0.00 | Z | 4.00) |
| α | 51.96 | β | 0.00 | γ | 0.00 |
| (α | 0.00 | β | 0.00 | γ | 0.00) |

Displacement and tilt (6)

| X | 0.00 | Y | 37.13 | Z | 47.84 |
|---|---|---|---|---|---|
| (X | 0.00 | Y | 0.00 | Z | 19.00) |
| α | 41.43 | β | 45.99 | γ | 17.57 |
| (α | -10.53 | β | 46.00 | γ | 17.57) |

Displacement and tilt (7)

| X | 44.00 | Y | 44.28 | Z | 43.57 |
|---|---|---|---|---|---|
| (X | 44.00 | Y | 7.77 | Z | 22.00) |
| α | 63.70 | β | -54.62 | γ | -15.33 |
| (α | 11.74 | β | -54.62 | γ | -15.33) |

Displacement and tilt (8)

| X | 32.00 | Y | 23.29 | Z | 28.21 |
|---|---|---|---|---|---|
| (X | 32.00 | Y | 6.94 | Z | -4.00) |
| α | -132.55 | β | 12.45 | γ | 75.27 |
| (α | -4.51 | β | 167.55 | γ | -104.73) |

Displacement and tilt (9)

| X | 32.00 | Y | 46.58 | Z | 55.23 |
|---|---|---|---|---|---|
| (X | 32.00 | Y | 0.00 | Z | 31.00) |
| α | 51.96 | β | 0.00 | γ | 0.00 |
| (α | 0.00 | β | 0.00 | γ | 0.00) |

Displacement and tilt (10)

| X | 32.00 | Y | 48.16 | Z | 56.47 |
|---|---|---|---|---|---|
| (X | 32.00 | Y | 0.00 | Z | 33.00) |
| α | 51.96 | β | 0.00 | γ | 15.73 |
| (α | 0.00 | β | 0.00 | γ | 15.74) |

(Example 3: Optical Path for Left Eye)

| Surface No. | Radius of curvature | Surface separation | Displacement and tilt | Refractive index | Abbe's No. |
|---|---|---|---|---|---|
| Object plane | ∞ | -1000.00 | | | |
| 1 | ∞ (Pupil) | | | | |
| 2 | ASS ① | | (1) | 1.5254 | 56.2 |
| 3 | FFS ① (RE) | | (2) | 1.5254 | 56.2 |
| 4 | ASS ① (RE) | | (1) | 1.5254 | 56.2 |
| 5 | ASS ② | | (3) | 1.5254 | 56.2 |
| 6 | ∞ (HRP) | | (4) | | |
| 7 | FFS ② | | (5) | 1.5254 | 56.2 |
| 8 | FFS ③ (RE) | | (6) | 1.5254 | 56.2 |
| 9 | FFS ④ (RE) | | (7) | 1.5254 | 56.2 |
| 10 | FFS ⑤ (RE) | | (8) | 1.5254 | 56.2 |
| 11 | ASS ③ | | (9) | | |
| Image plane | ∞ | | (10) | | |

ASS ①

| R | -368.45 |
|---|---|
| K | 0.0000 |
| A | $4.5583 \times 10^{-7}$ |
| B | $-1.5145 \times 10^{-10}$ |

ASS ②

| R | -48.92 |
|---|---|
| K | 0.0000 |
| A | $2.9667 \times 10^{-6}$ |

ASS ③

| R | -30.00 |
|---|---|
| K | 0.0000 |
| A | $4.2130 \times 10^{-5}$ |

FFS ①

| $C_4$ | $-7.4375 \times 10^{-3}$ | $C_6$ | $-6.4478 \times 10^{-3}$ | $C_8$ | $3.6852 \times 10^{-5}$ |
|---|---|---|---|---|---|
| $C_{10}$ | $3.8267 \times 10^{-5}$ | $C_{11}$ | $1.2477 \times 10^{-6}$ | $C_{13}$ | $2.5929 \times 10^{-6}$ |
| $C_{15}$ | $9.3753 \times 10^{-7}$ | $C_{17}$ | $2.7365 \times 10^{-8}$ | $C_{19}$ | $2.3475 \times 10^{-8}$ |
| $C_{21}$ | $4.5123 \times 10^{-8}$ | | | | |

FFS ②

| $C_4$ | $1.2113 \times 10^{-2}$ | $C_5$ | $4.3957 \times 10^{-3}$ | $C_6$ | $1.7363 \times 10^{-3}$ |
|---|---|---|---|---|---|
| $C_7$ | $6.7274 \times 10^{-5}$ | | | | |

FFS ③

| $C_4$ | $2.7585 \times 10^{-3}$ | $C_5$ | $-2.2633 \times 10^{-3}$ | $C_6$ | $-2.1496 \times 10^{-3}$ |
|---|---|---|---|---|---|
| $C_7$ | $-1.2980 \times 10^{-5}$ | $C_8$ | $2.4352 \times 10^{-5}$ | $C_9$ | $1.2164 \times 10^{-4}$ |
| $C_{10}$ | $-1.4806 \times 10^{-4}$ | $C_{11}$ | $-3.1978 \times 10^{-6}$ | $C_{12}$ | $3.4083 \times 10^{-6}$ |
| $C_{13}$ | $3.7744 \times 10^{-6}$ | $C_{14}$ | $3.4678 \times 10^{-5}$ | $C_{15}$ | $4.5731 \times 10^{-5}$ |
| $C_{16}$ | $1.9178 \times 10^{-7}$ | $C_{17}$ | $1.0060 \times 10^{-7}$ | $C_{18}$ | $1.9182 \times 10^{-7}$ |
| $C_{19}$ | $1.0242 \times 10^{-7}$ | $C_{21}$ | $3.9019 \times 10^{-6}$ | | |

FFS ④

| $C_4$ | $-3.8824 \times 10^{-3}$ | $C_5$ | $-4.4423 \times 10^{-4}$ | $C_6$ | $-3.8240 \times 10^{-3}$ |
|---|---|---|---|---|---|
| $C_7$ | $8.2712 \times 10^{-6}$ | $C_8$ | $1.9357 \times 10^{-5}$ | $C_9$ | $3.0205 \times 10^{-6}$ |
| $C_{10}$ | $2.7338 \times 10^{-5}$ | $C_{11}$ | $1.7450 \times 10^{-7}$ | $C_{12}$ | $-1.8579 \times 10^{-7}$ |
| $C_{13}$ | $1.5047 \times 10^{-6}$ | $C_{14}$ | $-1.0329 \times 10^{-6}$ | $C_{15}$ | $1.2398 \times 10^{-6}$ |
| $C_{16}$ | $-8.5732 \times 10^{-9}$ | $C_{17}$ | $5.3323 \times 10^{-8}$ | $C_{18}$ | $-1.6212 \times 10^{-7}$ |
| $C_{19}$ | $1.3303 \times 10^{-7}$ | $C_{21}$ | $-1.7930 \times 10^{-8}$ | | |

FFS ⑤

| $C_4$ | $-7.7644 \times 10^{-3}$ | $C_5$ | $-6.4826 \times 10^{-6}$ | $C_6$ | $-6.0150 \times 10^{-3}$ |
|---|---|---|---|---|---|
| $C_7$ | $3.1011 \times 10^{-6}$ | $C_8$ | $-1.6971 \times 10^{-5}$ | $C_9$ | $7.0993 \times 10^{-6}$ |
| $C_{10}$ | $-2.2276 \times 10^{-5}$ | $C_{11}$ | $8.3257 \times 10^{-8}$ | $C_{12}$ | $-3.1221 \times 10^{-7}$ |
| $C_{13}$ | $-7.3208 \times 10^{-7}$ | $C_{14}$ | $-4.5097 \times 10^{-7}$ | $C_{15}$ | $-6.2018 \times 10^{-7}$ |
| $C_{16}$ | $-3.2268 \times 10^{-9}$ | $C_{17}$ | $3.5107 \times 10^{-8}$ | $C_{18}$ | $9.6470 \times 10^{-9}$ |
| $C_{19}$ | $5.0804 \times 10^{-9}$ | $C_{21}$ | $2.0644 \times 10^{-9}$ | | |

Displacement and tilt (1)

| X | 0.00 | Y | 7.33 | Z | 28.44 |
|---|---|---|---|---|---|
| α | 16.20 | β | 0.00 | γ | 0.00 |

Displacement and tilt (2)

| X | 0.00 | Y | 0.84 | Z | 39.60 |
|---|---|---|---|---|---|
| α | -12.47 | β | 0.00 | γ | 0.00 |

Displacement and tilt (3)

| X | 0.00 | Y | 22.17 | Z | 36.13 |
|---|---|---|---|---|---|
| α | 81.38 | β | 0.00 | γ | 0.00 |

Displacement and tilt (4)

| X | 0.00 | Y | 22.17 | Z | 36.13 |
|---|---|---|---|---|---|
| (X | 0.00 | Y | 22.17 | Z | 36.13) |
| α | 51.96 | β | 0.00 | γ | 180.00 |
| (α | 51.96 | β | 0.00 | γ | 180.00) |

-continued

| Displacement and tilt (5) | | | | | |
|---|---|---|---|---|---|
| X | 0.00 | Y | 25.32 | Z | 38.60 |
| (X | 0.00 | Y | 0.00 | Z | 4.00) |
| α | 51.96 | β | 0.00 | γ | 180.00 |
| (α | 0.00 | β | 0.00 | γ | 0.00) |
| Displacement and tilt (6) | | | | | |
| X | 0.00 | Y | 37.13 | Z | 47.84 |
| (X | 0.00 | Y | 0.00 | Z | 19.00) |
| α | 62.49 | β | −45.99 | γ | −162.43 |
| (α | −10.53 | β | 46.00 | γ | 17.57) |
| Displacement and tilt (7) | | | | | |
| X | −44.00 | Y | 34.71 | Z | 55.81 |
| (X | 44.00 | Y | 7.77 | Z | 22.00) |
| α | 40.22 | β | 54.62 | γ | 164.67 |
| (α | 11.74 | β | −54.62 | γ | −15.33) |
| Displacement and tilt (8) | | | | | |
| X | −32.00 | Y | 14.74 | Z | 39.13 |
| (X | 32.00 | Y | 6.94 | Z | −4.00) |
| α | −123.53 | β | −12.45 | γ | −104.74 |
| (α | −4.51 | β | 167.55 | γ | −104.73) |
| Displacement and tilt (9) | | | | | |
| X | −32.00 | Y | 46.58 | Z | 55.23 |
| (X | 32.00 | Y | 0.00 | Z | 31.00) |
| α | 51.96 | β | 0.00 | γ | 180.00 |
| (α | 0.00 | β | 000 | γ | 0.00) |
| Displacement and tilt (10) | | | | | |
| X | −32.00 | Y | 48.16 | Z | 56.47 |
| (X | 32.00 | Y | 0.00 | Z | 33.00) |
| α | 51.96 | β | 0.00 | γ | 15.73 |
| (α | 0.00 | β | 0.00 | γ | 195.74) |

Figure 8:
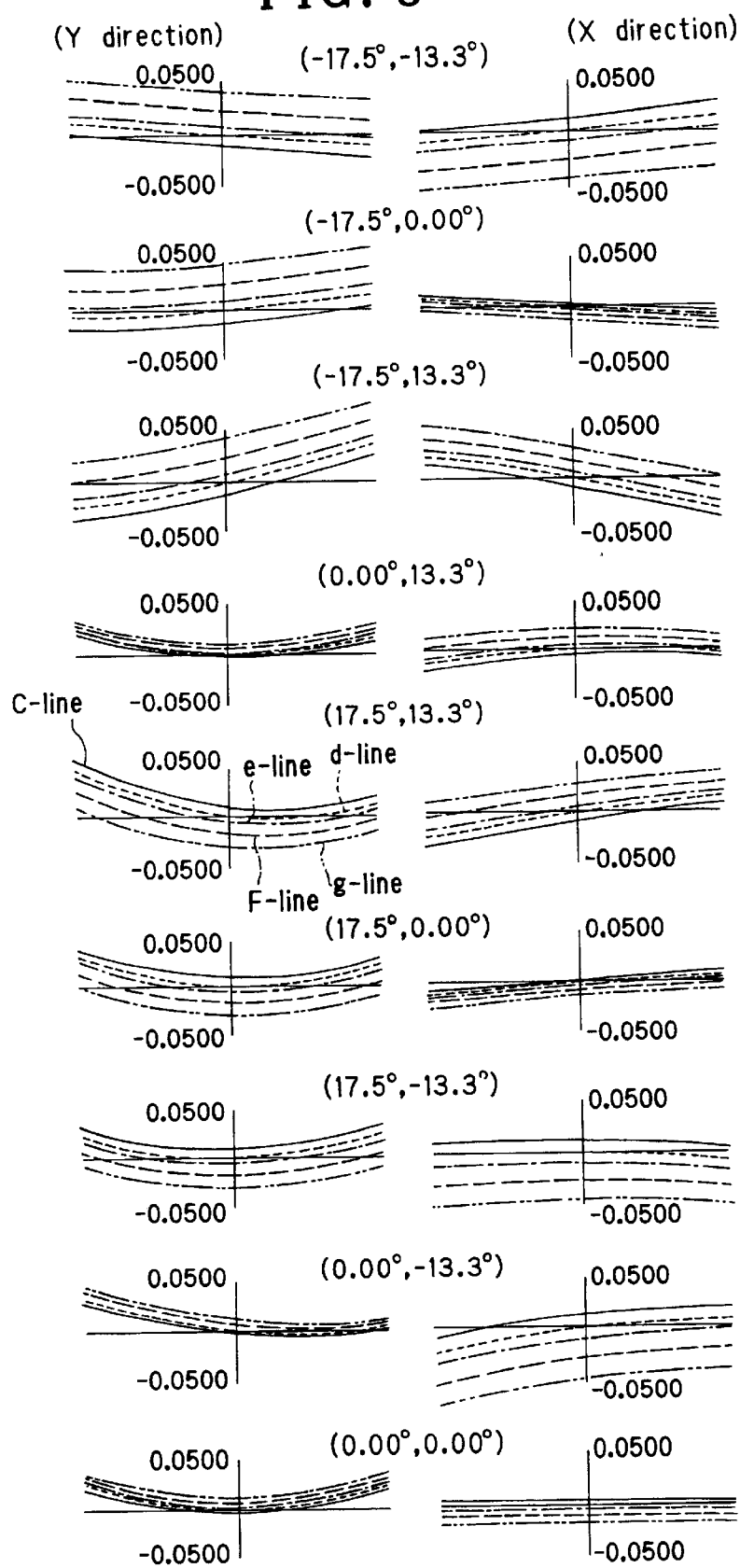
FIG. 8 is a diagram showing lateral aberrations in Example 1.
Figure 9:
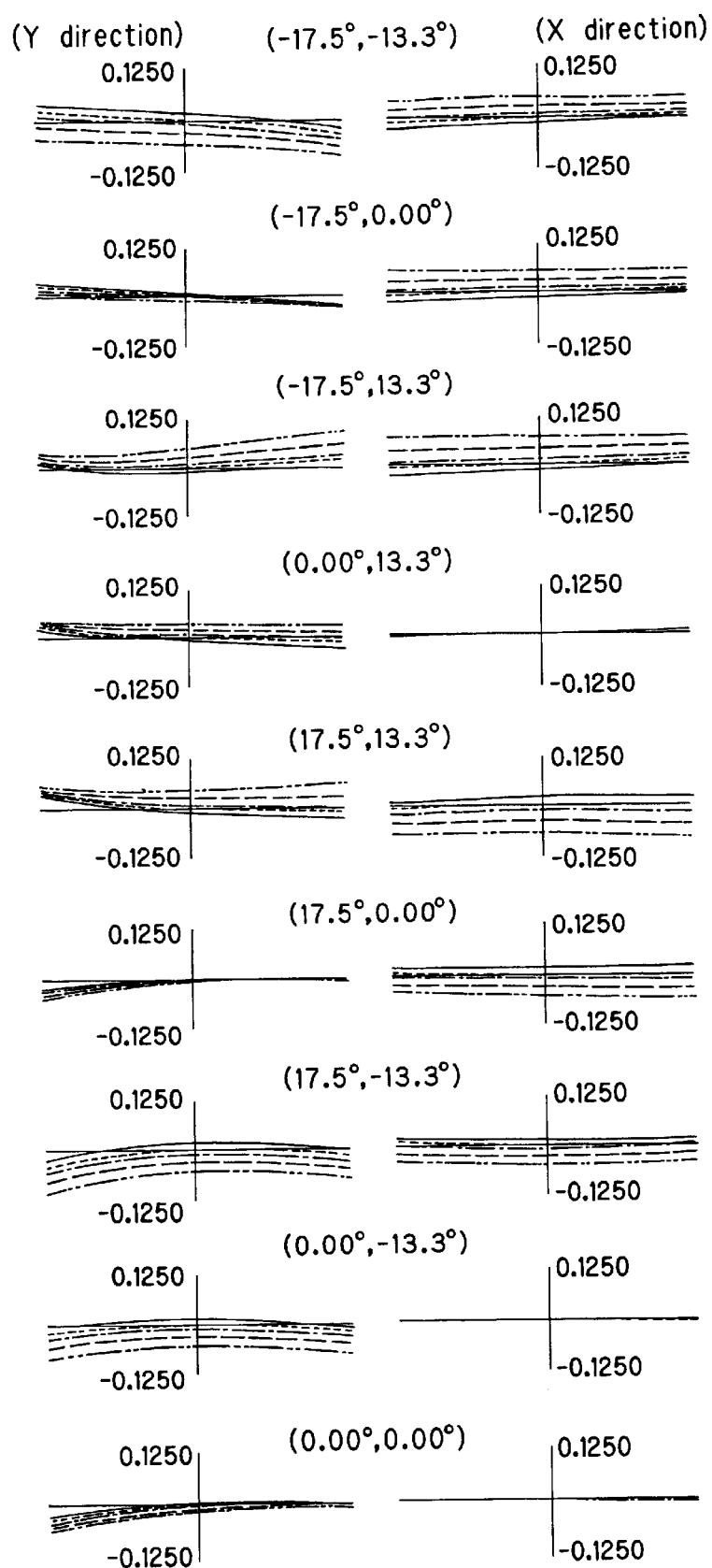
FIG. 9 is a diagram showing lateral aberrations in Example 3.
Figure 10:
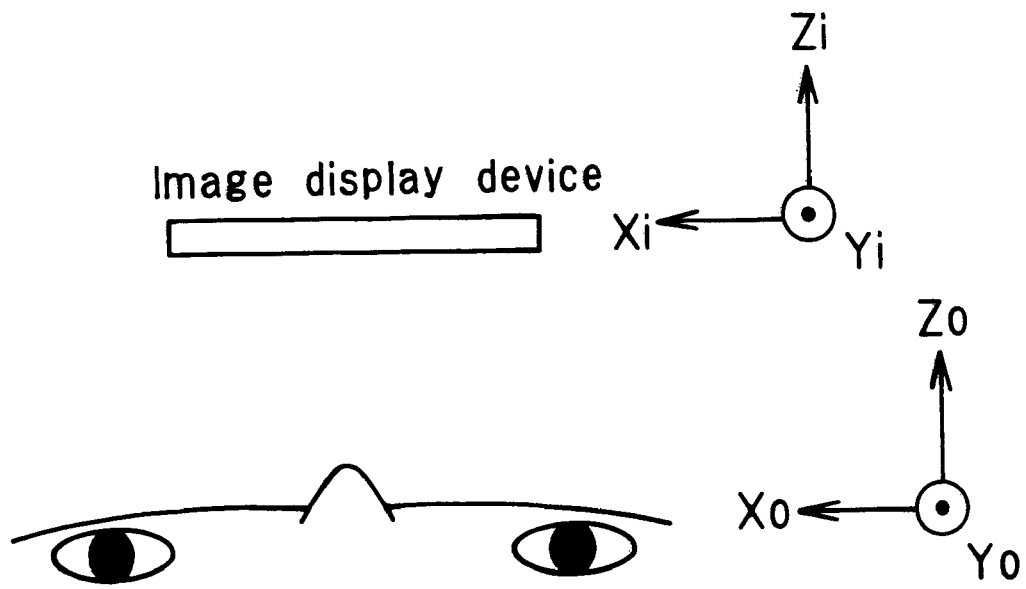
FIG. 10 is an image view showing the placement of an image display device in an image display apparatus comprising a bilaterally plane symmetry optical system.

Lateral aberrations in the above-described Examples 1 and 3 are shown in FIGS. 8 and 9, respectively. In the diagrams showing lateral aberrations, the numerals in the parentheses denote (horizontal field angle, vertical field angle), and lateral aberrations at the field angles are shown.

The values of θ concerning the condition (1) in the above-described Examples are as follows:

| Examples | θ |
|---|---|
| 1 | 65.6° |
| 2 | 42.7° |
| 3 | 32.8° |

Incidentally, in the image display apparatus according to the present invention, a display light beam emitted from a single image display device 3 at a somewhat divergent exit angle is made incident on the entrance surface 27 of the optical path distributing prism 20 (Example 1) while being split into the left and right optical paths so that the display light beam can be observed with two eyes through the left and right ocular prisms 10L and 10R. An image display device such as that shown in part (a) of FIG. 14 may be used as the image display device 3 common to the left and right optical paths. The image display device 3 shown in part (a) of FIG. 14 comprises a liquid crystal display device 31 that is illuminated uniformly with a white backlight 32 and that emits a display light beam at an exit angle larger than the angle θ [the condition (1)] formed between the optical axes of the left and right optical paths. As the image display device 3, it is also possible to use an autoluminescence type display device having a large exit angle of display light, such as an electroluminescent (EL) display device.

Figure 14A:
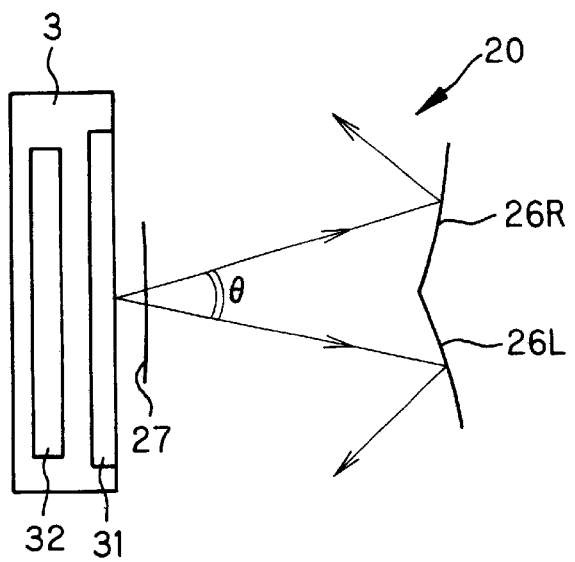
FIG. 14 is a diagram for describing an image display device usable in the present invention, together with a distributed light reinforcing member and an anti-reflection member for the image display device.
Figure 14B:
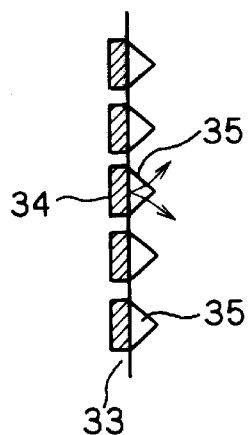
Figure 14C:
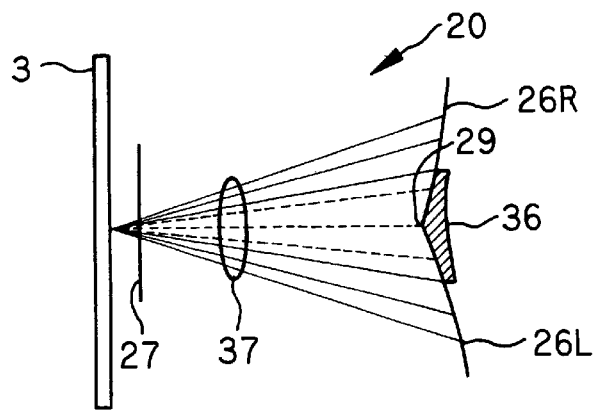

When an image display device 33 having a small exit angle of display light is used as the image display device 3, as shown in part (b) of FIG. 14, it is desirable to place a light beam distributing microprism 35 in correspondence to each pixel 34. The light beam distributing microprism 35 has a sectional configuration as shown in the figure, by way of example, to serve as a distributed light reinforcing member whereby the exit angle of display light emitted from each pixel 34 is increased in the directions of the left and right optical paths, not in the direction perpendicular to the pixel 34. In place of the light beam distributing microprism 35, a transmission type diffraction grating arranged to weaken the intensity of zeroth-order transmitted light and to intensify ±1st-order diffracted light may be positioned in close proximity to the display surface of the image display device 3.

Incidentally, if a display light beam emitted from the image display device 3 impinges on a boundary portion 29 between the left and right reflecting surfaces 26L and 26R (Example 1) of the optical path distributing prism 20, which are positioned closest to the image display device 3 among the reflecting surfaces in the left and right optical paths, the light beam may be reflected from the boundary portion 29 to become ghost light. Therefore, it is desirable that, as shown in part (c) of FIG. 14, the boundary portion 29 and its vicinities should be coated with a black paint or subjected to a diffusion treatment to form an anti-reflection member 36 for preventing such reflection, thereby absorbing or diffusing a light beam portion (shown by the broken lines) of the display light beam 37 from the image display device 3 that is incident on the boundary portion 29. It should be noted that light beam portions of the display light beam 37 that are shown by the solid lines are led to the left and right optical paths as light beams effectively used for the display.

Incidentally, it is possible to form a stationary or portable image display apparatus allowing observation with both eyes by properly supporting the above-described viewing optical system.

Figure 15:
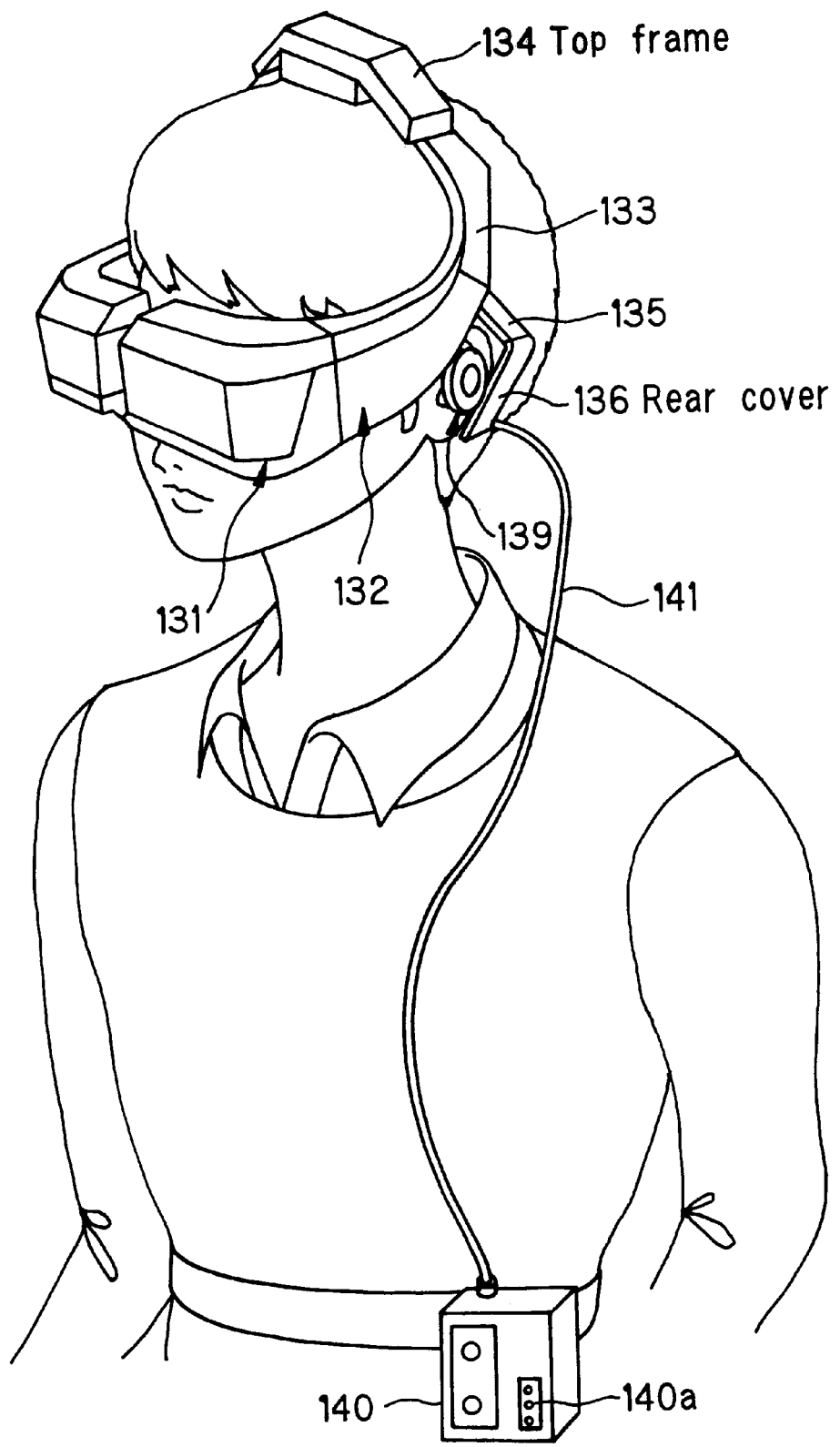
FIG. 15 is a diagram showing an image display apparatus according to the present invention as arranged to be fitted for both eyes.

FIG. 15 shows the arrangement of the image display apparatus designed to be fitted for both eyes. In FIG. 15, reference numeral 131 denotes a display apparatus body unit, which is fixed by a support member through the observer's head so that the display apparatus body unit 131 is held in front of both the observer's eyes. The support member has a pair of front frames 132 (left and right) each joined at one end thereof to the display apparatus body unit 131. The left and right front frames 132 extend from the observer's temples to the upper portions of his/her ears, respectively. A pair of rear frames 133 (left and right) are joined to the other ends of the front frames 132, respectively, and extend over the side portions of the observer's head. The support member further has a top frame 134 joined at both ends thereof to the other ends of the left and right rear frames 133, respectively, so that the top frame 134 supports the top of the observer's head.

A rear plate 135 is joined to one front frame 132 near the joint to the rear frame 133. The rear plate 135 is formed from an elastic member, e.g. a metal leaf spring. A rear cover 136, which constitutes a part of the support member, is joined to the rear plate 135 so that the rear cover 136 can support the apparatus at a position behind the observer's ear in a region extending from the back part of the head to the base of the neck. A speaker 139 is mounted inside the rear plate 135 or the rear cover 136 at a position corresponding to the observer's ear.

A cable 141 for transmitting external image and sound signals is led out from the display apparatus body unit 131. The cable 141 extends through the top frame 134, the rear frames 133, the front frames 132 and the rear plate 135 and projects to the outside from the rear end of the rear plate 135 or the rear cover 136. The cable 141 is connected to a video-replaying unit 140. It should be noted that reference numeral 140*a* in the figure denotes a switch and volume control part of the video-replaying unit 140.

The cable 141 may have a jack and plug arrangement attached to the distal end thereof so that the cable 141 can be connected to an existing video deck or the like. The cable 141 may also be connected to a TV signal-receiving tuner so as to enable the user to enjoy watching TV. Alternatively, the cable 141 may be connected to a computer to receive computer graphic images or message images or the like from the computer. To eliminate the bothersome cord, the apparatus may be arranged to receive external radio signals through an antenna connected thereto.

Figure 16:
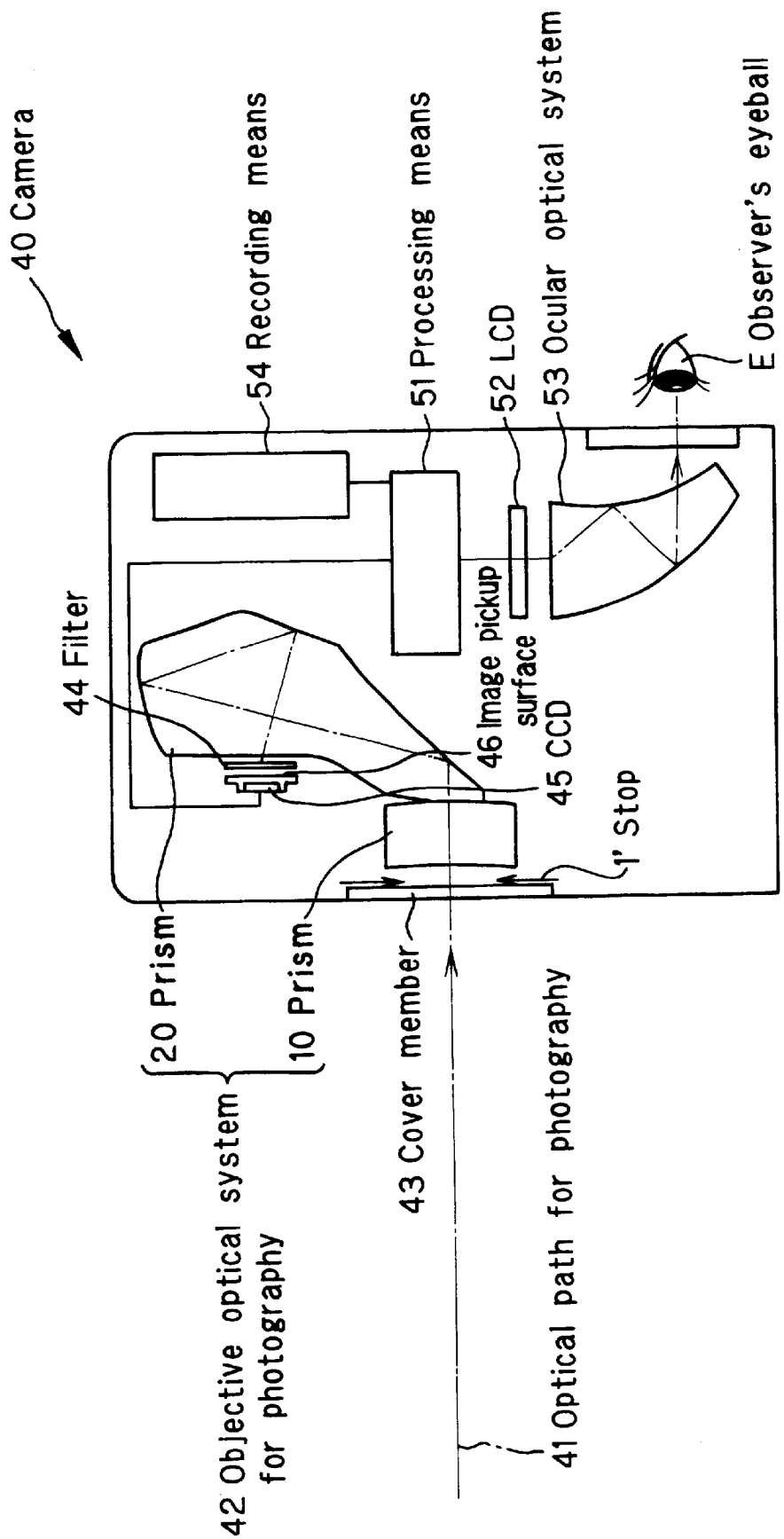
FIG. 16 is a conceptual view showing an arrangement in which an optical system according to the present invention is incorporated into an objective optical system for photography in a photography part of an electronic camera.

The viewing optical system of the image display apparatus according to the present invention is also usable as an image-forming optical system by introducing light from a subject from the pupil 1 (1R or 1L) side and placing an image pickup device at the position of the image display device 3. FIG. 16 is a conceptual view showing an arrangement in which only one of the left and right optical systems constituting the viewing optical system in the present invention is incorporated into an objective optical system 42 for photography of a photography part of an electronic camera 40. It is a matter of course that both the left and right optical systems constituting the viewing optical system in the present invention may be used (in this case, an optical system having two entrance pupils is formed). In this example, the objective optical system 42 for photography placed in an optical path 41 for photography uses an optical system similar to Example 3 except that the optical path is reverse to that in Example 3. A stop 1' is placed at the position of the pupil 1. An object image produced by the objective optical system 42 for photography is formed on an image pickup surface 46 of a CCD 45 through a filter 44, e.g. a low-pass filter or an infrared cutoff filter. The object image received by the CCD 45 is processed in a processing means 51 and displayed in the form of an electronic image on a liquid crystal display device (LCD) 52. The processing means 51 also controls a recording means 54 for recording the object image detected by the CCD 45 in the form of electronic information. The image displayed on the LCD 52 is led to an observer's eyeball E through an ocular optical system 53 that is formed from a decentered prism similar to the ocular prism 10. As the ocular optical system 53, it is also possible to use a three-dimensionally decentered optical system including one ocular prism 10 and the optical path distributing prism 20 according to the present invention. It should be noted that the objective optical system 42 for photography may include another lens (a positive lens or a negative lens) as a constituent element on the object side of the prism 10 or on the image side of the prism 20.

In the camera 40 arranged as stated above, the objective optical system 42 for photography can be constructed with a minimal number of optical members. Accordingly, the whole apparatus can be constructed in a compact form. Further, it is possible to provide a camera having a minimized dead space in consideration of other associated members at reduced costs. In addition, the degree of design freedom increases favorably.

Although in this example a plane-parallel plate is placed as a cover member 43 of the objective optical system 42 for photography, it is also possible to use a lens having a power as the cover member 43.

Figure 17:
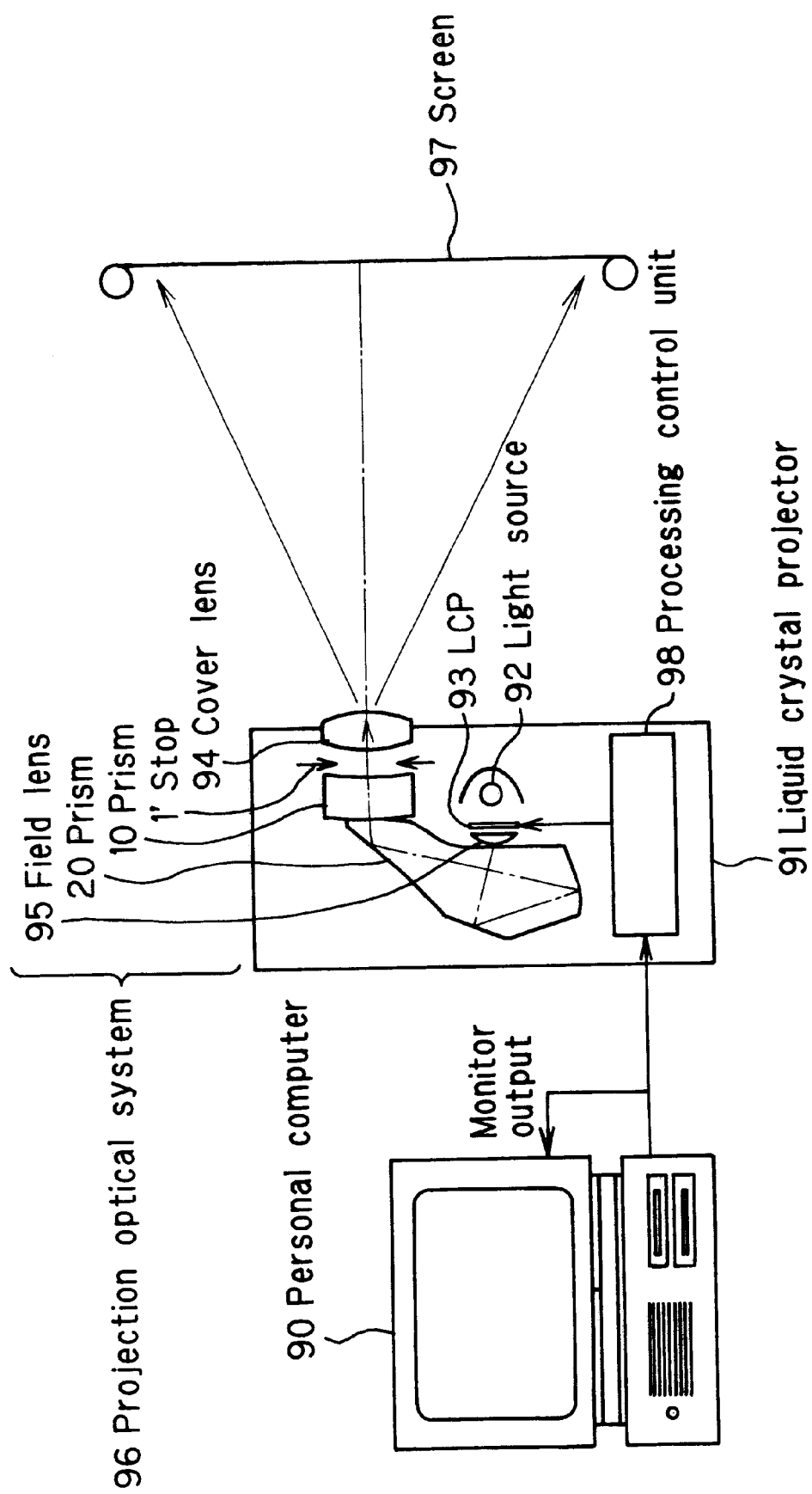
FIG. 17 is a conceptual view showing an arrangement in which an optical system according to the present invention is applied to a projection optical system of a presentation system.

The optical system comprising only one of the left and right sides of the viewing optical system in the present invention can also be used as a projection optical system by placing an image plane for projection at the position of the image display device 3 and providing a screen in front of the pupil 1. In this case also, both the left and right optical systems constituting the viewing optical system in the present invention may be used (in this case, an optical system having two exit pupils is formed). FIG. 17 is a conceptual view showing an arrangement in which a decentered prism optical system according to the present invention is used in a projection optical system 96 of a presentation system formed by combining together a personal computer 90 and a liquid crystal projector 91. In this example, an optical system similar to Example 3 is used in the projection optical system 96. In the figure, image and manuscript data prepared on the personal computer 90 is branched from a monitor output and delivered to a processing control unit 98 in the liquid crystal projector 91. In the processing control unit 98 of the liquid crystal projector 91, the input data is processed and output to a liquid crystal panel (LCP) 93. The liquid crystal panel 93 displays an image corresponding to the input image data. Light from a light source 92 is applied to the liquid crystal panel 93. The amount of light transmitted by the liquid crystal panel 93 is determined by the gradation of the image displayed on the liquid crystal panel 93. Light from the liquid crystal panel 93 is projected on a screen 97 through a projection optical system 96 comprising a field lens 95 placed immediately in front of the liquid crystal panel 93 and prisms 20 and 10 constituting the optical system according to the present invention, together with a cover lens 94 which is a positive lens.

The projector arranged as stated above can be constructed with a minimal number of optical members. Accordingly, a low-cost projector can be realized. In addition, the projector can be constructed in a compact form.

As will be clear from the foregoing description, the present invention allows observation of the image of a single image display device with both eyes. Accordingly, the costs can be reduced extremely. Further, because free-form surfaces are used in the optical path distributing prism for distributing the image to the two eyes, aberration correction can be made favorably. Further, because no half-mirror is used, a bright image can be observed. Because the whole viewing optical system comprising the left and right ocular prisms and the optical path distributing prism is three-dimensionally decentered, it is possible to provide a display apparatus allowing observation of the image of a single image display device with two eyes at a very wide field angle. Further, because the decentration plane of each ocular prism is set in the vertical direction, an extremely wide field angle can be ensured despite the image display apparatus allowing observation of the image of a single image display device with both eyes.

What we claim is:

1. An image display apparatus having a three-dimensionally decentered optical path, said image display apparatus comprising:
   an image display device for forming an image for observation on an image display area; and
   a viewing optical system for leading the image formed by said image display device to a pupil corresponding to a position where an eyeball of an observer is to be placed;
   said image display device being a single image display device having a plurality of pixels juxtaposed on a single substrate;
   wherein each pixel located at least in a central portion of said single image display device is arranged to emit an image light beam at such an exit angle that the light beam can be led to left and right eyes of the observer;

said viewing optical system including at least:
a left ocular part for leading the light beam to the left eye of the observer;
a right ocular part for leading the light beam to the right eye of the observer; and
an optical path distributing part for distributing the image light beam emitted from said image display device at said exit angle to said left ocular part and said right ocular part;
said left ocular part having at least two reflecting surfaces, wherein at least one of said at least two reflecting surfaces is formed from a rotationally asymmetric curved reflecting surface having a function of correcting decentration aberrations;
said right ocular part having at least two reflecting surfaces, wherein at least one of said at least two reflecting surfaces is formed from a rotationally asymmetric curved reflecting surface having a function of correcting decentration aberrations;
wherein said left ocular part and said right ocular part are arranged so that a plane of a decentered optical path of an axial principal ray formed by said at least two reflecting surfaces of said left ocular part (said plane being a YZ-plane, which is a vertical direction of the observer) and a plane of a decentered optical path of an axial principal ray formed by said at least two reflecting surfaces of said right ocular part (said plane being a YZ-plane, which is a vertical direction of the observer) are approximately parallel to each other (YZ-plane); and
wherein said optical path distributing part has optical surfaces arranged in bilaterally rotational symmetry to form left and right optical paths that are not in plane symmetry with each other but in 180-degree rotational symmetry with respect to only a normal line passing through a center of said image display device, and said optical path distributing part has at least two pairs of reflecting surfaces as said optical surfaces for the left and right optical paths.

2. An image display apparatus having a three-dimensionally decentered optical path according to claim 1, wherein said at least two pairs of reflecting surfaces for the left and right optical paths are arranged so that the axial principal ray entering said optical path distributing part in the left optical path for the left eye of said viewing optical system is not in a same plane as the axial principal ray exiting said optical path distributing part in the left optical path, and the axial principal ray entering said optical path distributing part in the right optical path for the right eye of said viewing optical system is not in a same plane as the axial principal ray exiting said optical path distributing part in the right optical path.

3. An image display apparatus having a three-dimensionally decentered optical path according to claim 1, wherein said at least two pairs of reflecting surfaces for the left and right optical paths are arranged so that the axial principal ray exiting said optical path distributing part in the left optical path for the left eye of said viewing optical system is approximately parallel to the axial principal ray exiting said optical path distributing part in the right optical path for the right eye of said viewing optical system.

4. An image display apparatus having a three-dimensionally decentered optical path according to claim 1, wherein said optical path distributing part has at least one pair of rotationally asymmetric curved reflecting surfaces having a function of correcting decentration aberrations.

5. An image display apparatus having a three-dimensionally decentered optical path according to claim 1, wherein said optical path distributing part has at least two pairs of rotationally asymmetric curved reflecting surfaces having a function of correcting decentration aberrations.

6. An image display apparatus having a three-dimensionally decentered optical path according to claim 1, wherein said optical path distributing part has at least three pairs of reflecting surfaces for the left and right optical paths, and said at least three pairs of reflecting surfaces are rotationally asymmetric curved reflecting surfaces having a function of correcting decentration aberrations.

7. An image display apparatus having a three-dimensionally decentered optical path according to claim 1, wherein said viewing optical system is formed from a prism member, wherein all of said reflecting surfaces are back-coated reflecting surfaces formed on surfaces of said prism member.

8. An image display apparatus having a three-dimensionally decentered optical path according to claim 7, wherein said viewing optical system includes:
an optical path distributing prism constituting said optical path distributing part;
a left ocular prism constituting said left ocular part; and
a right ocular prism constituting said right ocular part;
wherein said left ocular prism and said right ocular prism are separated from said optical path distributing prism by an air space.

9. An image display apparatus having a three-dimensionally decentered optical path according to claim 8, wherein said optical path distributing prism includes:
an entrance surface disposed to face at least said image display device so that both an image light beam forming the left optical path for the left eye and an image light beam forming the right optical path for the right eye enter said optical path distributing prism through said entrance surface;
a left exit surface through which the light beam of said left optical path exits said optical path distributing prism;
at least three left reflecting surfaces disposed in an optical path between said entrance surface and said left exit surface to reflect the light beam of said left optical path within said optical path distributing prism;
a right exit surface through which the light beam of said right optical path exits said optical path distributing prism; and
at least three right reflecting surfaces disposed in an optical path between said entrance surface and said right exit surface to reflect the light beam of said right optical path within said optical path distributing prism;
wherein said optical path distributing prism is arranged so that an entering optical axis of the axial principal ray incident on a reflecting surface closest to said entrance surface among the left reflecting surfaces in said left optical path is not in a same plane as an exiting optical axis of the axial principal ray exiting a reflecting surface remotest from said entrance surface among the left reflecting surfaces, and an entering optical axis of the axial principal ray incident on a reflecting surface closest to said entrance surface among the right reflecting surfaces in said right optical path is not in a same plane as an exiting optical axis of the axial principal ray exiting a reflecting surface remotest from said entrance surface among the right reflecting surfaces.

10. An image display apparatus having a three-dimensionally decentered optical path according to claim 9, wherein the reflecting surface closest to said entrance surface in said left optical path and the reflecting surface closest to said entrance surface in said right optical path are positioned adjacent to each other so as to face both said image display device and said entrance surface.

11. An image display apparatus having a three-dimensionally decentered optical path according to claim 10, wherein said optical path distributing prism has an anti-reflection member provided for an area including a boundary portion between the left and right reflecting surfaces closest to said entrance surface among the reflecting surfaces in said left and right optical paths to prevent light rays emitted perpendicularly from a central region of said image display device from being reflected as ghost light.

12. An image display apparatus having a three-dimensionally decentered optical path according to claim 1, wherein a distributed light reinforcing member is disposed between said image display device and said optical path distributing part so that a light intensity of an image light beam emitted at a predetermined exit angle from each pixel located at least in the central portion of said single image display device is made higher by said distributed light reinforcing member than an intensity of a light beam emitted in a direction perpendicular to a surface of said pixel.

13. An image display apparatus having a three-dimensionally decentered optical path according to any one of claims 1, wherein both said left ocular prism and said right ocular prism are arranged so that each ocular prism has, in order from said optical path distributing prism side, an entrance surface, a first reflecting surface, a second reflecting surface, and an exit surface, and said first reflecting surface and said exit surface are formed from an identical surface, and further said first reflecting surface is a reflecting surface using total reflection at said surface.

14. An image display apparatus having a three-dimensionally decentered optical path according to claim 13, wherein said entrance surface of each of said left ocular prism and said right ocular prism is formed from a rotationally asymmetric curved surface that corrects decentration aberrations.

15. An image display apparatus having a three-dimensionally decentered optical path according to claim 14, wherein the rotationally asymmetric curved surface that forms said entrance surface of each of said left ocular prism and said right ocular prism is a free-form surface having only one plane of symmetry.

16. An image display apparatus having a three-dimensionally decentered optical path according to claim 13, wherein said second reflecting surface of each of said left ocular prism and said right ocular prism is formed from a rotationally asymmetric curved surface that corrects decentration aberrations.

17. An image display apparatus having a three-dimensionally decentered optical path according to claim 16, wherein the rotationally asymmetric curved surface that forms said second reflecting surface of each of said left ocular prism and said right ocular prism is a free-form surface having only one plane of symmetry.

18. An image display apparatus having a three-dimensionally decentered optical path according to claim 1, wherein said viewing optical system forms a relay image of the image displayed by said image display device in said right optical path for the right eye and also forms a relay image of the image displayed by said image display device in the said left optical path for the left eye.

19. An image display apparatus having a three-dimensionally decentered optical path according to claim 1, wherein said image display device is rotated through a desired angle about the normal line passing through the center of said image display device as an axis of rotation so that a horizontal direction of an image display area of said image display device is at an angle to a plane containing exiting optical axes of left and right axial principal rays exiting said optical path distributing part.

20. An image display apparatus having a three-dimensionally decentered optical path according to claim 1, wherein the following condition is satisfied:

$$20° < \theta < 150° \qquad (1)$$

where $\theta$ is an angle formed between axial principal rays of left and right light beams led from each pixel located at least in a central portion of said image display device to the left and right eyes of the observer.

21. An image pickup apparatus comprising:
said image display apparatus having a three-dimensionally decentered optical path according to any one of claims 1 to 20; and
an image pickup device provided in place of said image display device;
wherein said pupil is arranged as an entrance pupil through which a light beam from a subject passes, and a subject image is formed on said image pickup device.

22. A projection apparatus comprising:
said image display apparatus having a three-dimensionally decentered optical path according to any one of claims 1 to 20;
a projection object provided in place of said image display device; and
a screen placed in front of said pupil to form a projected image of said projection object on said screen.

* * * * *